US011892939B2

(12) United States Patent
Reisinger et al.

(10) Patent No.: US 11,892,939 B2
(45) Date of Patent: Feb. 6, 2024

(54) AUTOMATIC INJECTION OF AGENTS INTO PROCESSES EXECUTING STATICALLY LINKED BINARIES

(71) Applicant: Dynatrace LLC, Waltham, MA (US)

(72) Inventors: Gernot Reisinger, Linz (AT); Thomas Koeckerbauer, Mittertreffling (AT); Michael Obermueller, Alkoven (AT)

(73) Assignee: Dynatrace LLC, Waltham, MA (US)

( * ) Notice: Subject to any disclaimer, the term of this patent is extended or adjusted under 35 U.S.C. 154(b) by 347 days.

(21) Appl. No.: 17/194,861

(22) Filed: Mar. 8, 2021

(65) Prior Publication Data

US 2021/0294726 A1    Sep. 23, 2021

Related U.S. Application Data

(60) Provisional application No. 62/992,928, filed on Mar. 21, 2020.

(51) Int. Cl.
*G06F 11/36* (2006.01)
*G06F 9/445* (2018.01)

(52) U.S. Cl.
CPC ...... *G06F 11/3644* (2013.01); *G06F 9/44521* (2013.01)

(58) Field of Classification Search
None
See application file for complete search history.

(56) References Cited

U.S. PATENT DOCUMENTS

| 6,546,553 | B1 * | 4/2003 | Hunt | G06F 9/449 714/38.14 |
|---|---|---|---|---|
| 8,151,277 | B2 | 4/2012 | Greifeneder et al. | |
| 8,234,631 | B2 | 7/2012 | Greifeneder et al. | |
| 8,402,443 | B2 | 3/2013 | Greifeneder et al. | |
| 8,464,225 | B2 | 6/2013 | Greifeneder | |
| 9,448,788 | B1 | 9/2016 | Barua et al. | |
| 9,658,867 | B2 * | 5/2017 | Sreedhar | G06F 9/4552 |
| 10,289,513 | B2 | 5/2019 | Spiegl et al. | |
| 10,417,065 | B2 | 9/2019 | Ambichl et al. | |
| 2005/0105712 | A1 | 5/2005 | Williams et al. | |
| 2012/0072480 | A1 | 3/2012 | Hays et al. | |

(Continued)

*Primary Examiner* — Craig C Dorais
(74) *Attorney, Agent, or Firm* — Harness, Dickey & Pierce, P.L.C.

(57) ABSTRACT

A system and method is disclosed for injecting in-process agents into processes executing self-contained, statically linked binaries that do not interact with a dynamic loader mechanism that identifies and resolves required libraries at run time. System calls directed to the execution of binaries in processes are intercepted and the targeted binary is analyzed to determine whether it is statically linked. In case a statically linked binary is identified, a proxy launcher process is started instead of the binary which starts the original binary as traceable child process. After the child process has loaded the original binary into its process memory, the memory image of the child process is copied to the launcher process and the child process is terminated. An agent is loaded into the launcher process to instruments the copied memory image. After the instrumentation is finished, the original start conditions for the statically linked binary are reconstructed and the entry function of the instrumented statically linked binary is called to execute the binary.

24 Claims, 13 Drawing Sheets

(56) References Cited

U.S. PATENT DOCUMENTS

| | | |
|---|---|---|
| 2013/0173351 A1 | 7/2013 | Livne et al. |
| 2013/0291051 A1 | 10/2013 | Balinsky et al. |
| 2016/0105350 A1 | 4/2016 | Greifeneder et al. |
| 2016/0202960 A1 | 7/2016 | Minh Le et al. |
| 2017/0078182 A1 | 3/2017 | Spiegl et al. |
| 2017/0093921 A1 | 3/2017 | Duan |
| 2017/0192810 A1 | 7/2017 | Lukacs et al. |
| 2017/0364377 A1 | 12/2017 | Koller Jemio et al. |
| 2018/0152534 A1 | 5/2018 | Kristiansson et al. |
| 2018/0157516 A1 | 6/2018 | Kristiansson et al. |
| 2018/0246812 A1 | 8/2018 | Aronovich et al. |
| 2018/0247064 A1 | 8/2018 | Aronovich et al. |
| 2020/0117483 A1* | 4/2020 | Greenfield .......... G06F 9/44521 |

* cited by examiner

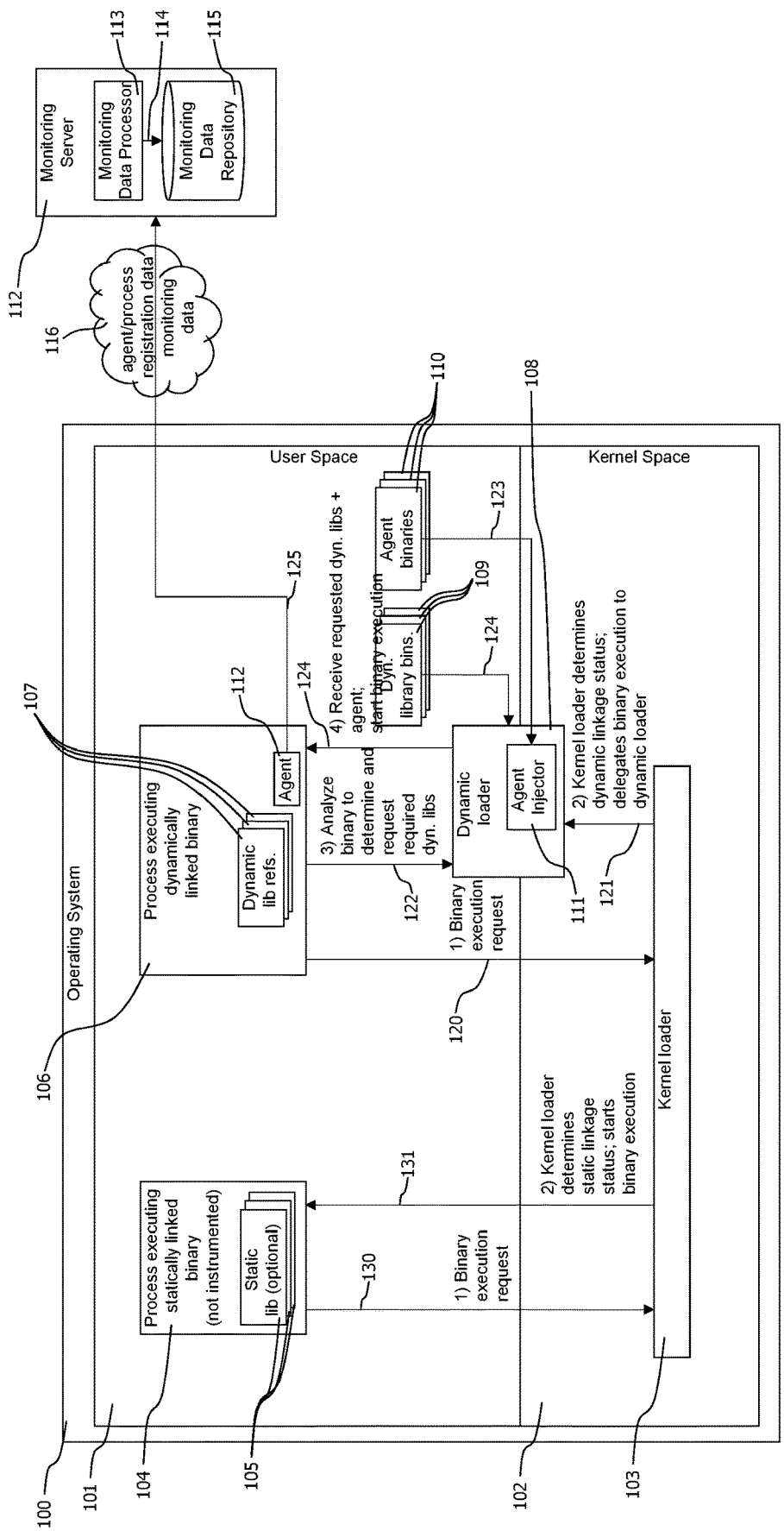
FIG 1: Prior Art

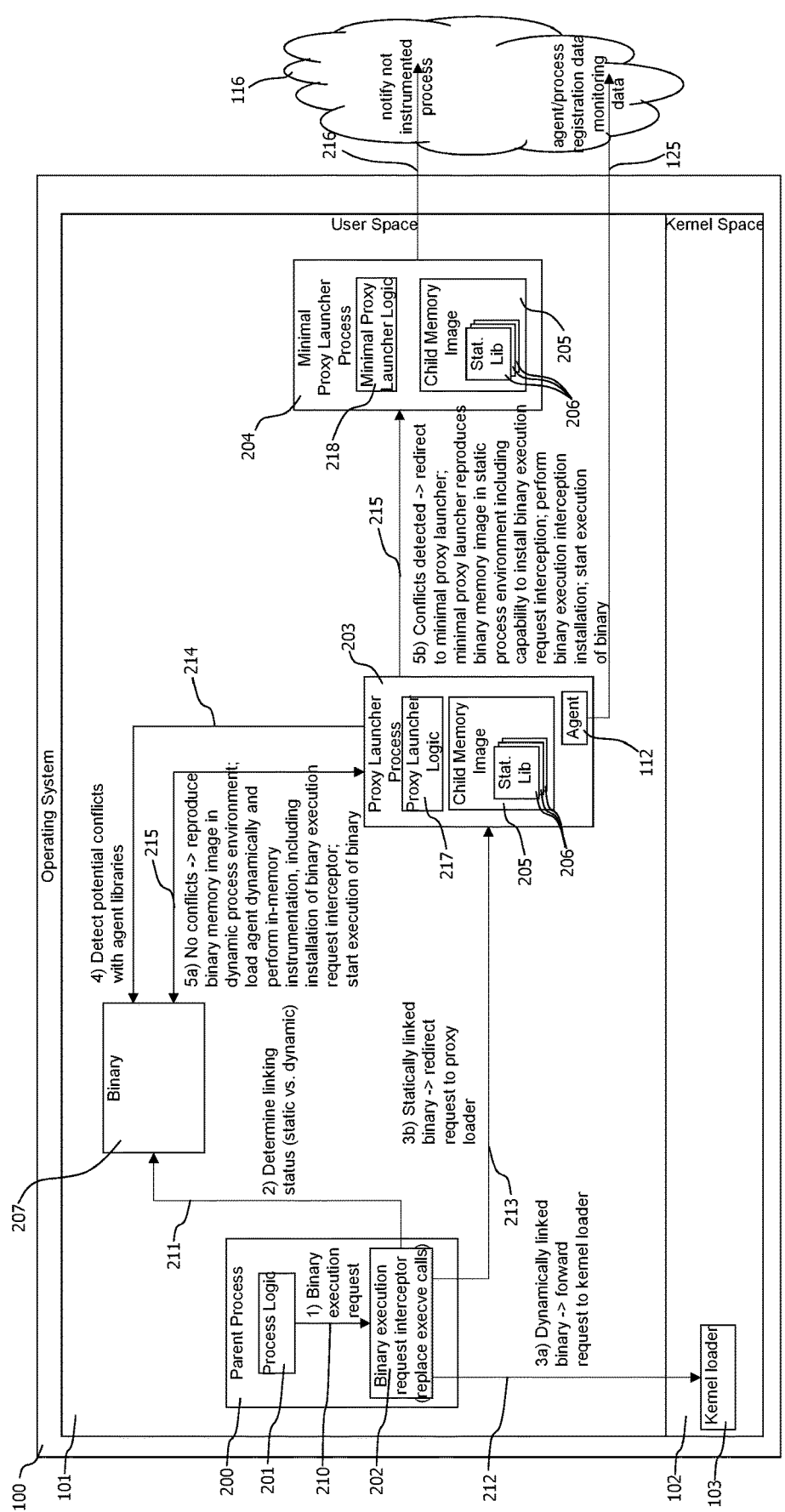
FIG 2: System Overview - Instrumentation of Processes Executing Statically Linked Binaries

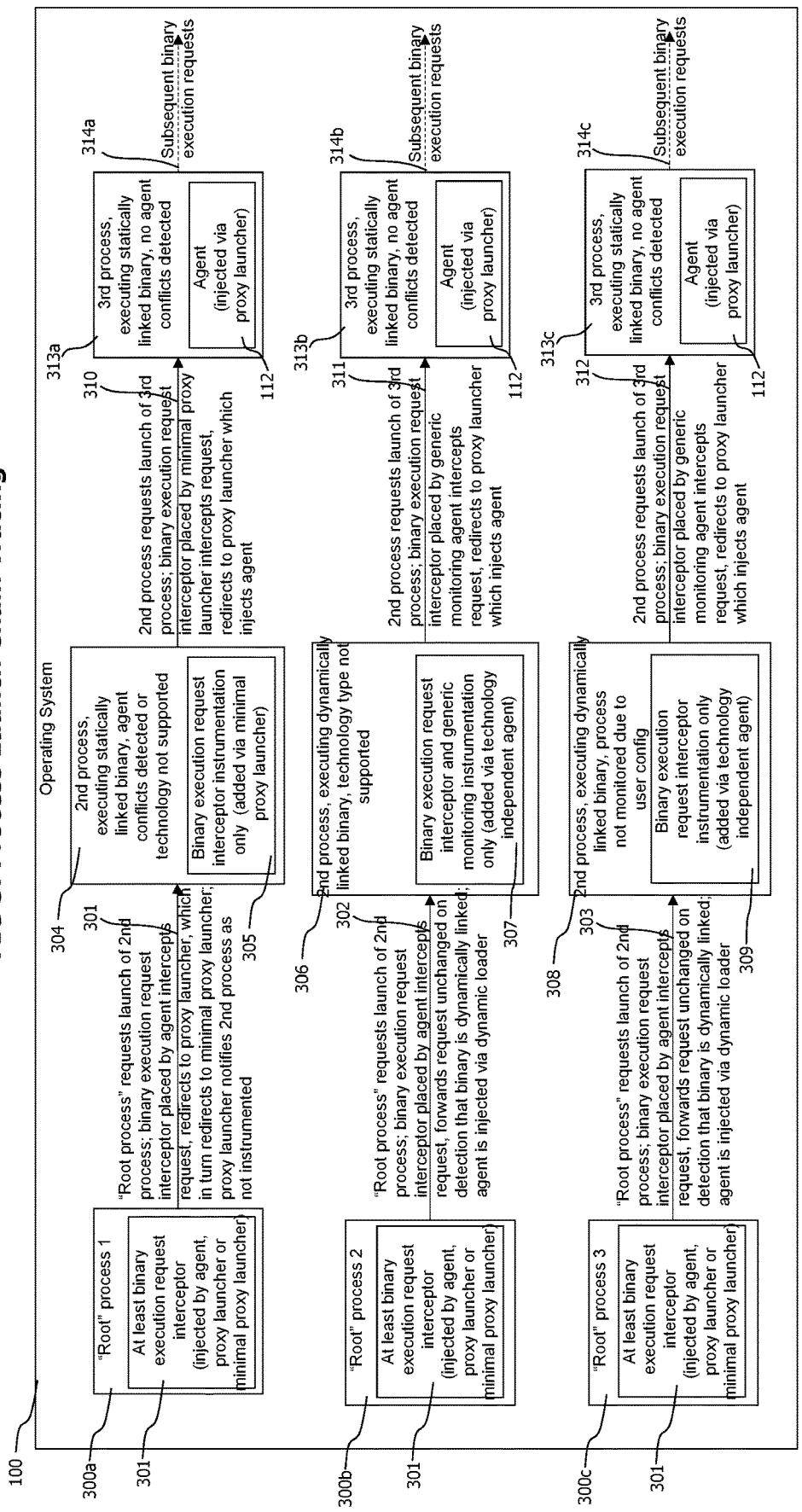

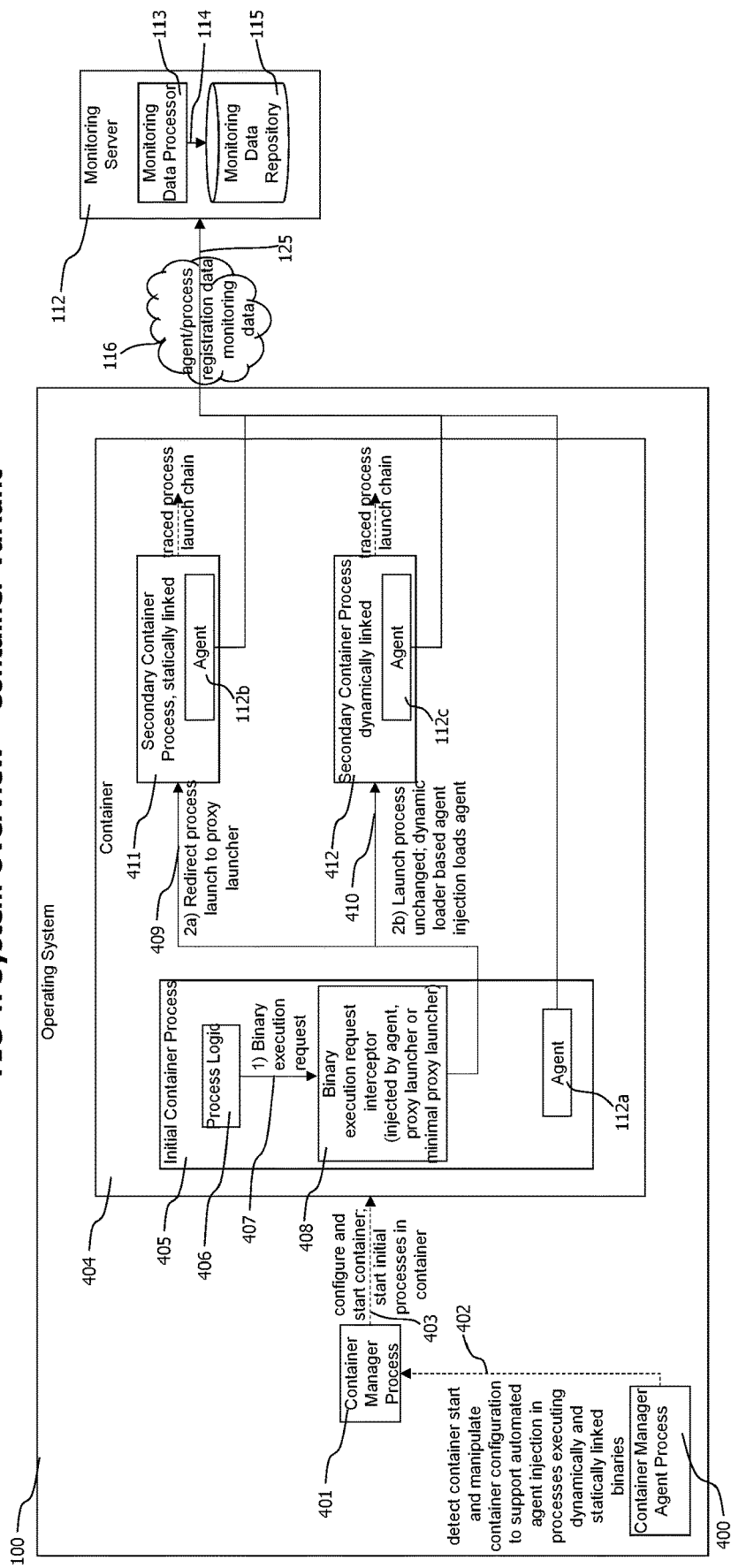
FIG 4: System Overview – Container Variant

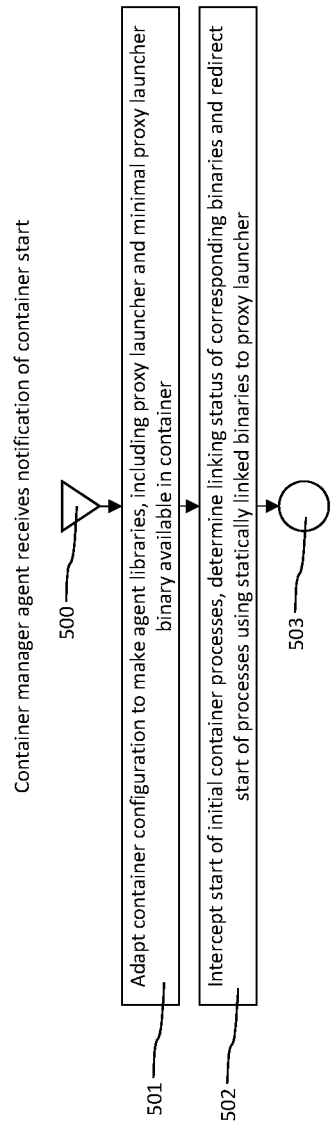
FIG 5: Container Manipulation by Container Manager Agent

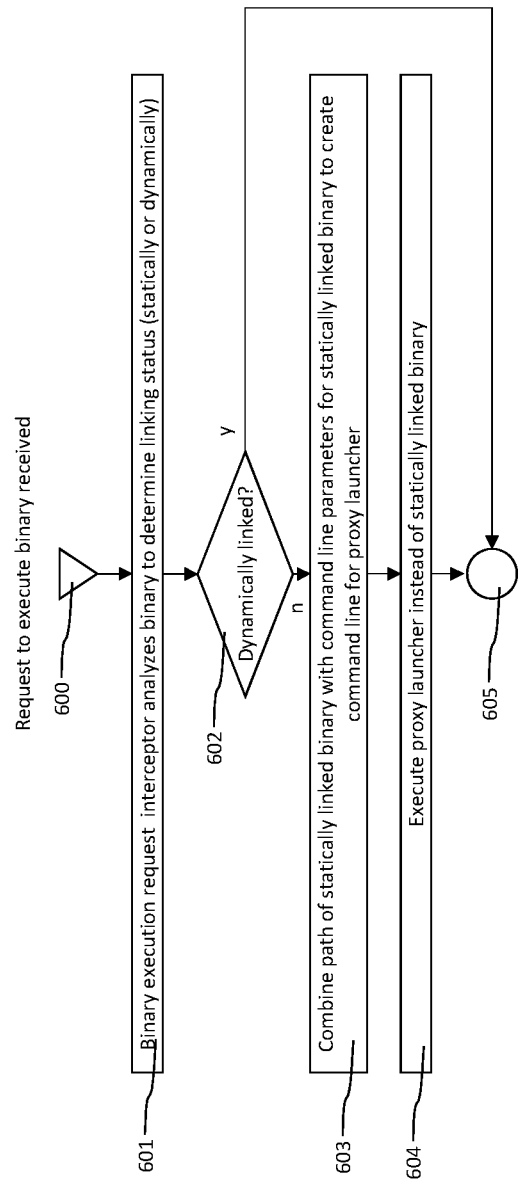

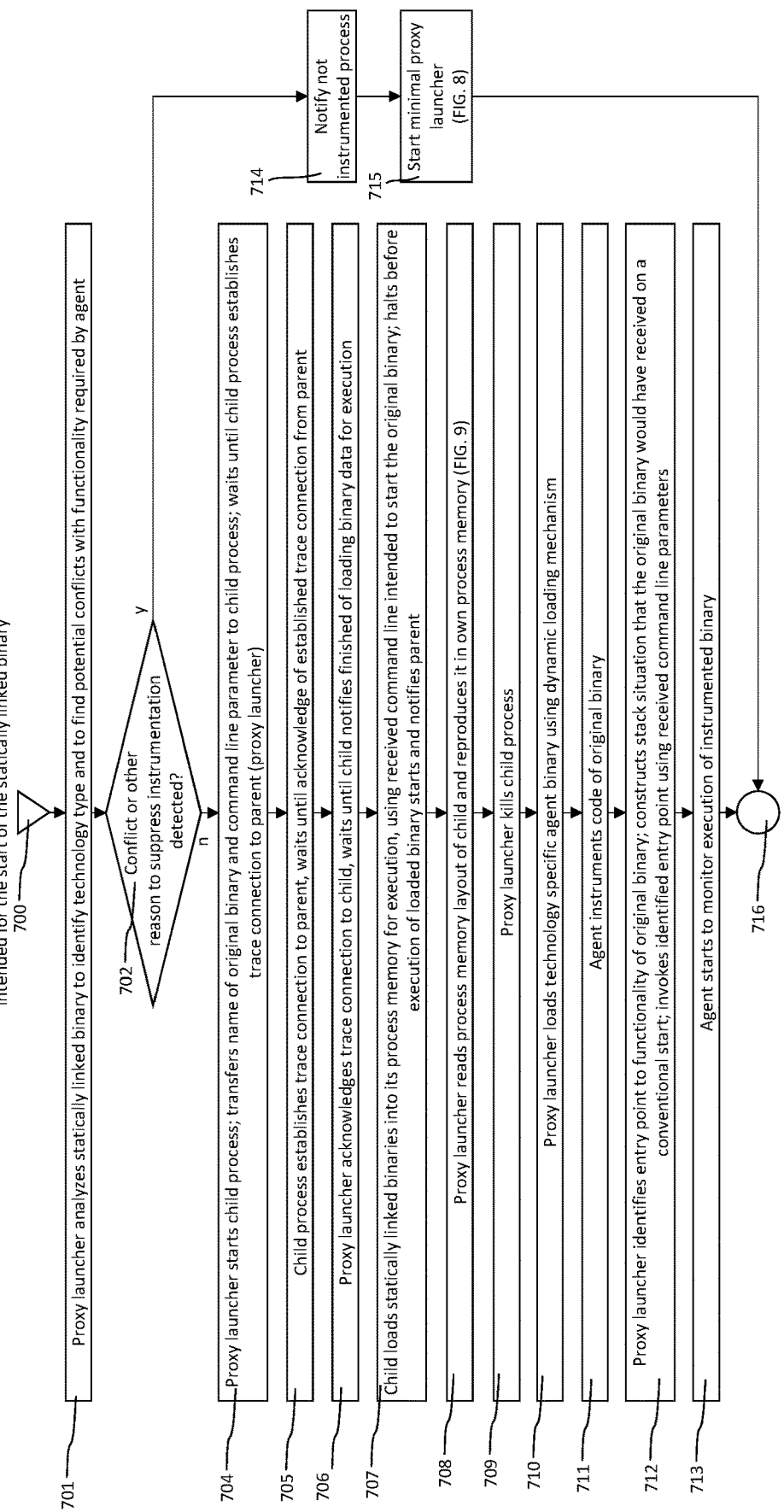

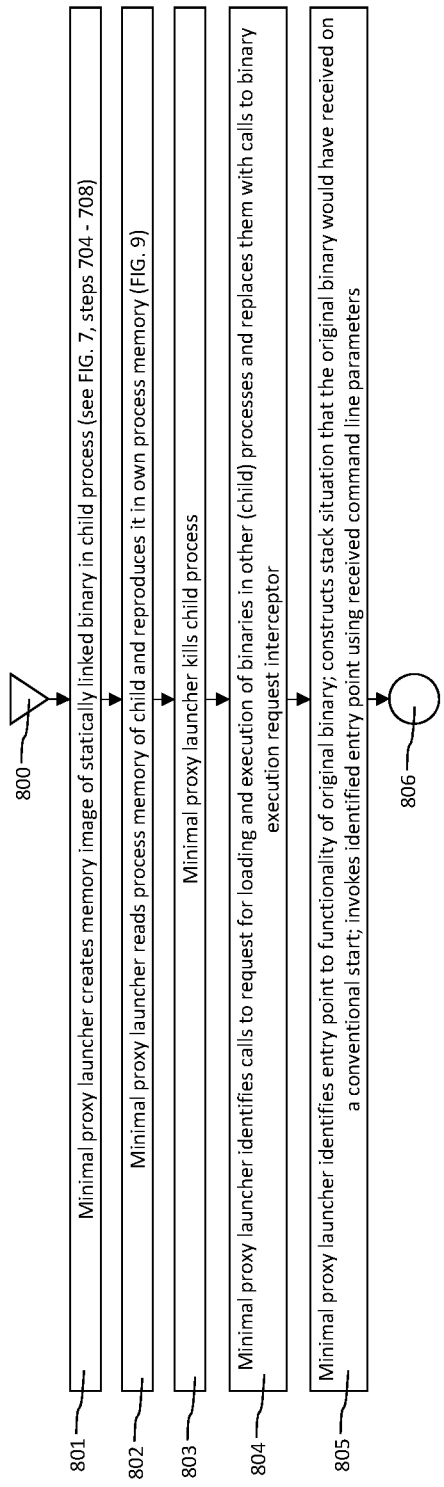

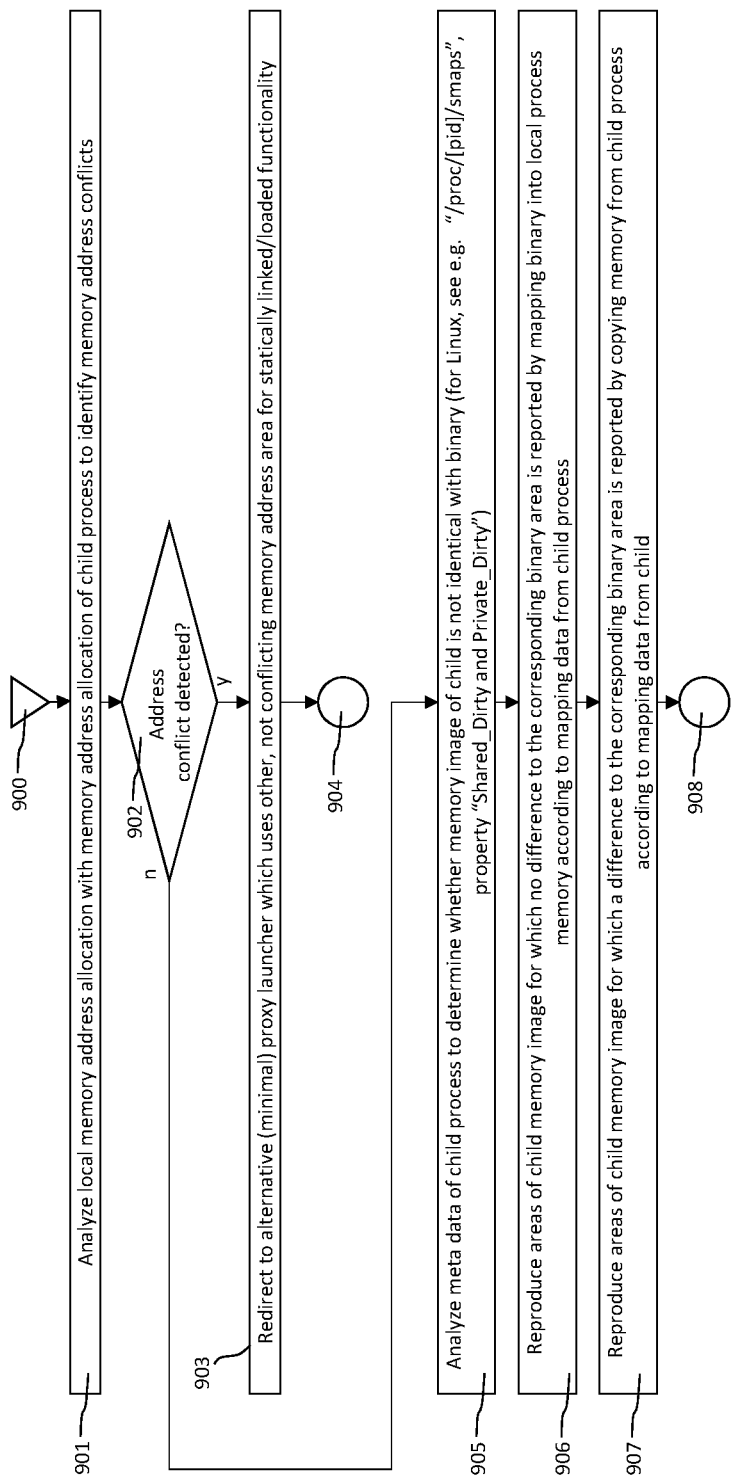

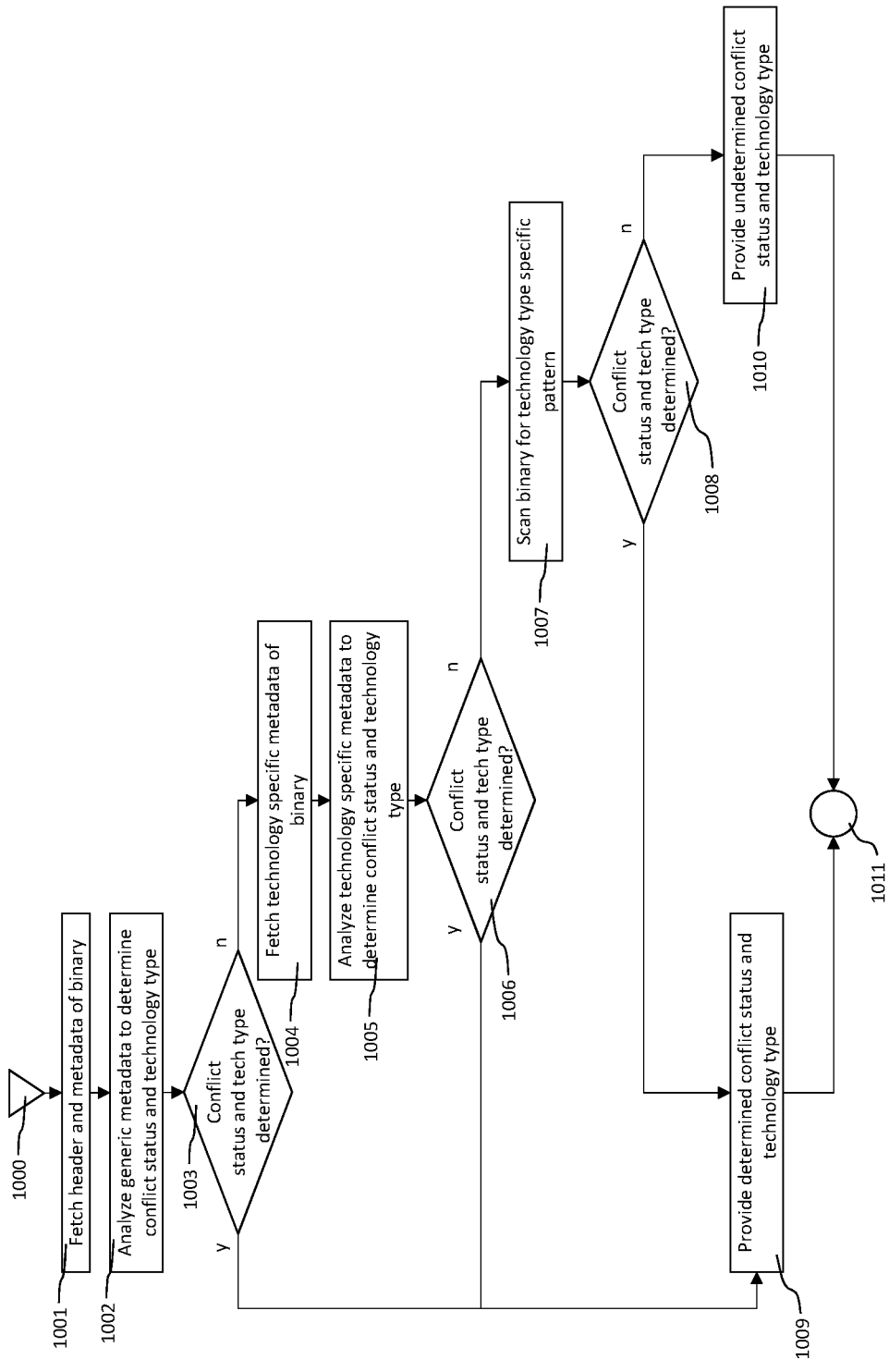

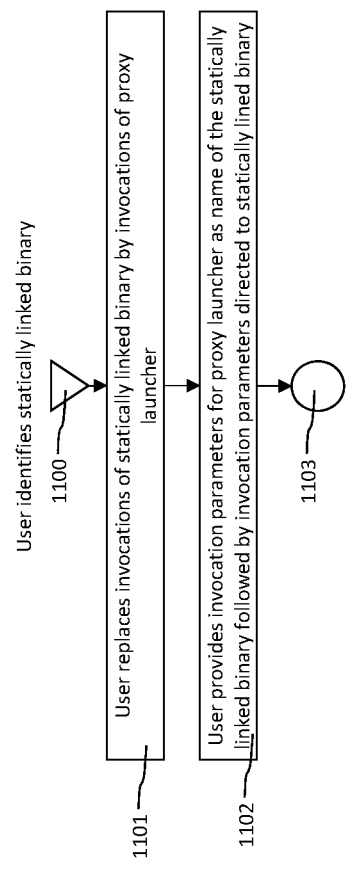
FIG 11: Manual Agent Injection Preparation

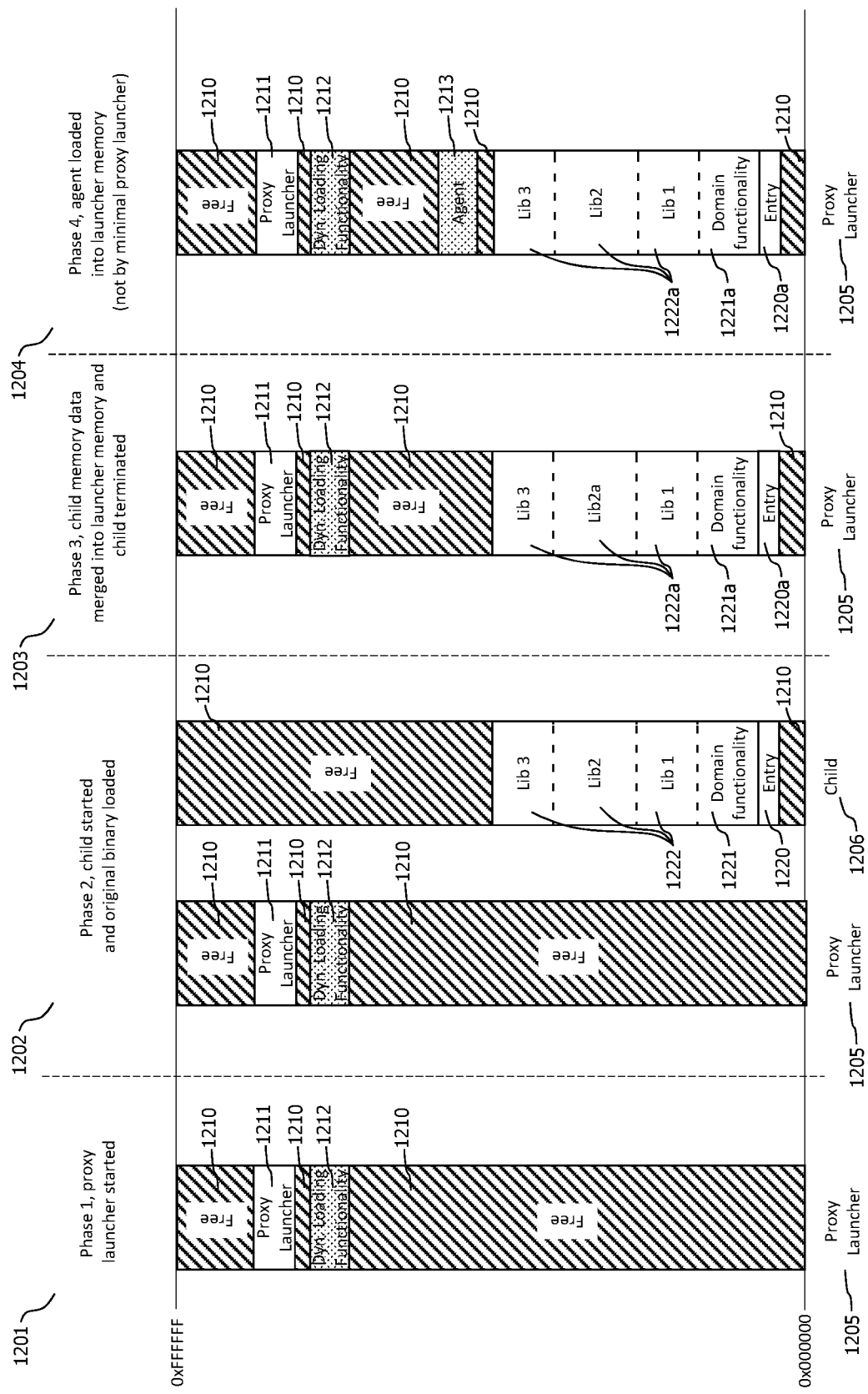

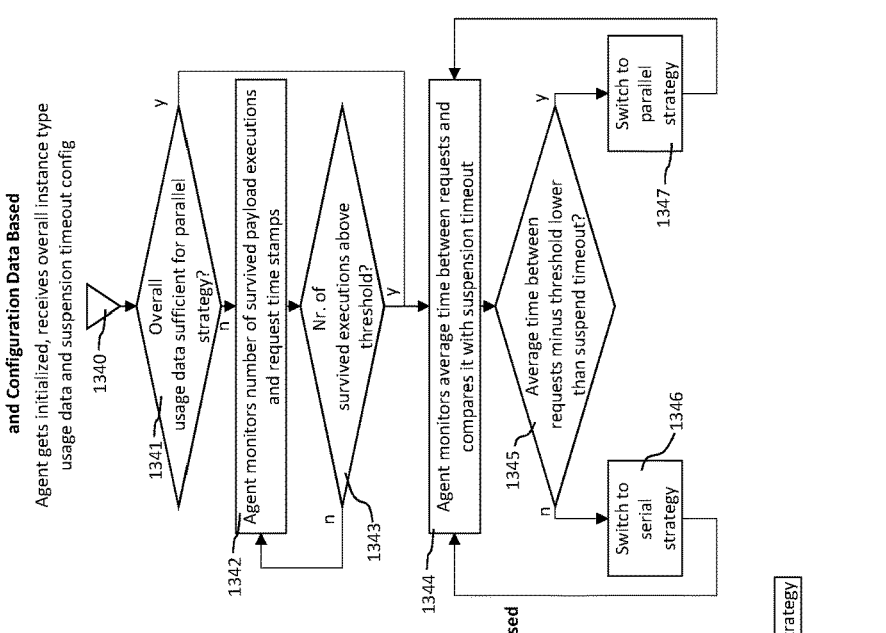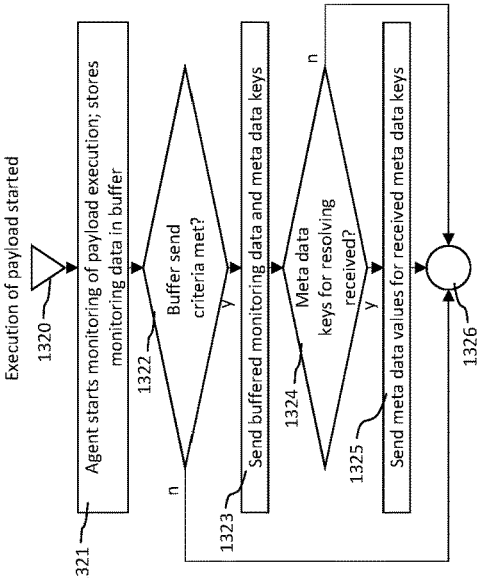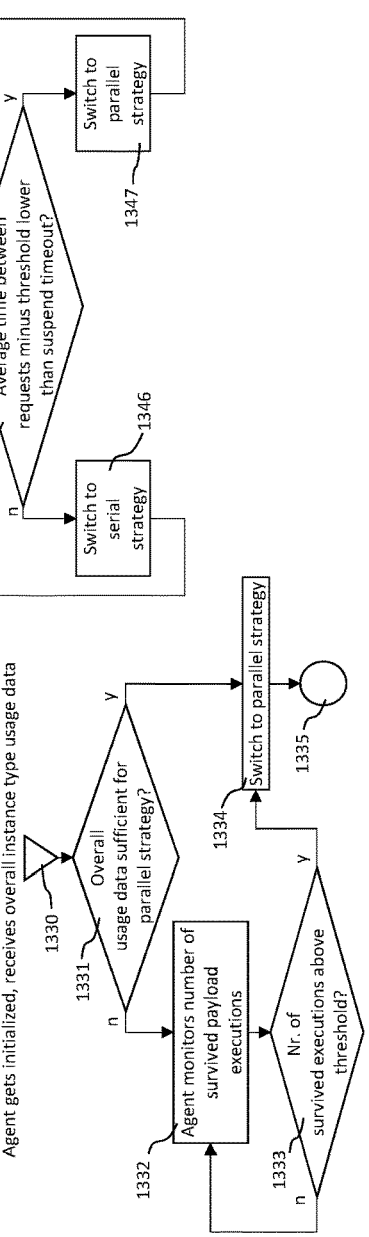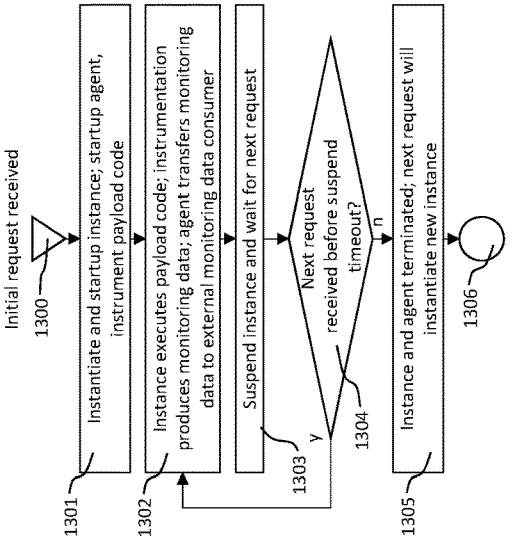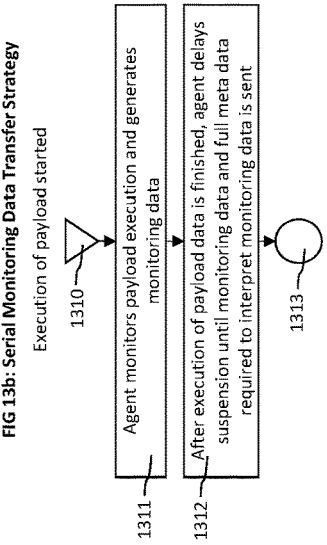

AUTOMATIC INJECTION OF AGENTS INTO PROCESSES EXECUTING STATICALLY LINKED BINARIES

CROSS-REFERENCE TO RELATED APPLICATIONS

This application claims the benefit of U.S. Provisional Application No. 62/992,928, filed on Mar. 21, 2020. The entire disclosure of the above application is incorporated herein by reference.

FIELD

The invention generally relates to the field of automatically injecting in-process agents into processes at startup and more specifically to injecting in-process agents into processes executing statically linked, self-contained binaries.

BACKGROUND

In the world of modern, commercial software applications, down-times, unexpected or erroneous behavior are serious problems, as they derogate the ability of those applications to generate profit. Visibility of the internal dynamics of components forming an application and also of the communication dependencies of those components, has become a key issue for the operators of such applications, as this visibility is the basis for efficient and fast identification and remediation of application defects.

Elastic execution environments, like cloud environments or automated container orchestration systems provide the computing infrastructure that enable the efficient and automated operation of high-load applications, as they may automatically scale an application according to current load conditions by e.g. starting or stopping new container instances providing application functionality to adapt the capacity of the application to the current load situation.

Modern application performance monitoring and management systems provide both agents that may be injected into processes of applications and automated injection technologies for those agents that are capable to also monitor fluctuating container instances without the need of manual configuration changes. U.S. Pat. No. 10,417,065 entitled "Method And System For Automated Agent Injection In Container Environments, which is incorporated herein by reference in its entirety, describes such an automated injection mechanism. Such automated injection systems are typically based on dynamic loading mechanisms provided by most operating systems. With this mechanism, binaries may specify libraries that are required for their execution. On start of those binaries, the operating system resolves the required libraries and dynamically loads them in the process executing those binaries. This mechanism may be used to additionally load agent functionality into those processes.

However, application components dedicated for container usage tend to not use this dynamic loading functionality, as this assures that the functionality of those components is independent of the operating system configuration. Therefore, automatic agent injection based on dynamic loading functionality does not work for such statically linked, self-contained binaries.

As a consequence, a method and system is required which extends the automated agent injection functionality to statically linked binaries.

This section provides background information related to the present disclosure which is not necessarily prior art.

SUMMARY

This section provides a general summary of the disclosure, and is not a comprehensive disclosure of its full scope or all of its features.

This disclosure describes technologies related to the automated injection of in-process agents into processes executing statically linked binaries. In contrast to dynamically linked binaries, for which dynamic loading functionality may be used to implement automatic agent injection, statically linked binaries are loaded solely by a kernel loader which provides no means of intervention during the startup process.

An approach to inject in-process agents into statically linked binaries is to intercept the system calls that are dedicated to the execution of binaries in processes. Such an interceptor may in a first step check whether the binary that is going to get executed is statically or dynamically linked. For dynamically linked binaries, the system call may be continued unchanged. For statically linked binaries, the system call may be adapted to execute a proxy process instead of the original binary. The adapted system call may also include data to identify the original binary (e.g. path and file name) and the command line for the original binary.

The proxy process may use identification data and command line of the original binary to start a debug-controlled child process that loads the binary. Debug-control provides various types of access for a controller process to a controlled process. The debug-control may be used to halt the child process after it finished loading the original binary into memory and then reproduce the memory image of the child process in the memory of the parent (proxy) process. After the process image was transferred from the child process to the parent process, the child process may be terminated. The proxy process may afterwards load agent functionality to instrument the transferred code and then execute it by first reconstructing the environment as it would have been seen by the original binary in a conventional start (e.g. adapt the stack data accordingly) and then calling the entry function of the binary.

Variant embodiments may in addition perform a check whether the original binary conflicts with the agent functionality. A conflict may e.g. occur when the original binary contains a statically linked version of a library which is also a dynamic dependency of the agent, and both agent and original binary use functionality of the library that uses global resources. Thread locals are a functionality that may cause a conflict, as different implementations of thread local functionality in different library versions may use the same global management structure, like e.g. a specific processor register. In case two versions of this functionality access the global management structure in an uncoordinated way, unexpected results may occur. In case a potential conflict is detected, the conflicting binary may not be instrumented and a notification reporting a not monitored process may be issued.

Yet other variant embodiments may in case of a potential conflict, in addition to reporting a notification for a not monitored process, perform a minimal instrumentation of the system calls of a conflicting binary that are directed to the execution of other binaries. Those call may be altered as described above to be able to also instrument statically linked binaries that are executed in processes started by the currently examined binary. With this minimal instrumentation, process launch chains, in which running processes in turn start sub-or child processes, may be traced and all not conflicting statically linked process in the launch chain may be instrumented with an agent and subsequently monitored.

Still other variant embodiments may provide multiple versions of proxy process binaries with varying address locations of the proxy launcher functionality. In those variant embodiments, the proxy launcher may, after a memory image of a statically linked binary was created in a child process, detect whether an address conflict between the memory image of the statically linked binary and the proxy launcher functionality exists. In such a conflict situation, the current version of the proxy process may be terminated and a different version of the proxy process with a different, not conflicting memory layout may be selected and used instead.

Other embodiments of the disclosed technologies may be directed to inject in-process agents into processes executing statically linked binaries in container environments. Such embodiments may e.g. intercept system calls performed by container management processes to start initial processes in container environments and adapt those system calls to start a proxy process instead of the original binary. Those embodiments may in addition change the container configuration to make agent and proxy process binaries available inside the container environment.

Another aspect of the disclosed technologies refers to the monitoring of stateless or serverless environments, in which all hardware and execution platform specific properties related to the execution of application code are hidden from the execution environment. Such stateless environments are typically used to implement applications according to design principles of a service-oriented, serverless architecture. Such applications are typically implemented as meshes of loosely coupled services, where individual services only provide a small subset of the overall application functionality. Stateless/serverless environments provide an easy to maintain and load elastic execution environment for those service-oriented applications.

Providing visibility of the execution of such services, in terms of performance and functionality is a crucial feature for modern application performance monitoring and management systems. However, the fact that the execution environment of those service execution instance is extremely short-lived—an execution environment may e.g. only live during the execution time of one single service call—makes it difficult to transfer monitoring data describing such service invocations to a location outside the service execution environment in an efficient way. The disclosed technologies may use a performance optimization of such stateless/serverless environments to reuse service execution environments for consecutive service calls that occur with a frequency that is above a certain threshold. Service execution frequencies may be monitored and knowledge of this frequency may be used to select an appropriate monitoring data send strategy for a given service load situation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a block diagram illustrating prior art technologies that may be used to inject agents into processes executing binaries that are started using a dynamic loader. The block diagram also shows why the prior art approach is not capable for processes that do not use a dynamic loader.

FIG. 2 provides a block diagram of the cooperation of binary execution request interceptor, proxy launcher and minimal proxy launcher to inject full in-process agents into processes executing statically linked binaries if possible and at least perform minimal instrumentation by injecting binary execution request interceptors in case an identified conflict does not allow the injection of a full in-process agent to keep monitoring of a process launch chain intact.

FIG. 3 shows three variants of process launch chains containing processes executing statically linked binaries into which a full in-process agent cannot be injected due to various reasons. The figure also shows that tracing the process launch chain remains intact in all those cases.

FIG. 4 shows a container execution environment adapted to support the injection of in-process agents into processes executing statically linked binaries in container environments. Especially, the manipulation of the start of initial container processes to at least contain a binary execution request interceptor is described.

FIG. 5 shows a flow chart describing the manipulations performed by a container manager agent to support agent injection for statically linked binaries in starting container instances.

FIG. 6 provides a flow chart of the process performed by the binary execution request interceptor on an intercepted binary execution request.

FIG. 7 shows a flow chart of the process performed by the proxy launcher process to inject an agent into a process executing a statically linked binary or to delegate to a minimal proxy launcher in case a conflict is identified between the agent and the to be launched statically linked binary.

FIG. 8 provides a flow chart of the process performed by the minimal proxy launcher to instrument processes executing conflicting statically linked binaries in a way to assure that process launch chains can be traced.

FIG. 9 shows a flow chart of the process performed by a proxy launcher to reproduce the memory image of a child process that has loaded a statically linked binary into the memory of the proxy launcher.

FIG. 10 shows a flow chart of a process to determine the existence of a potential conflict of a statically linked binary with functionality used by an agent. The process also identifies the technology type of the analyzed statically linked binary.

FIG. 11 shows a flow chart of the steps required for the manual instrumentation of a statically linked binary.

FIG. 12 visually describes the changes of the memory layouts of a proxy launcher and its child process to reconstruct the memory image of a statically linked binary in the memory of the proxy launcher, together with a dynamically loaded agent that is required for the instrumentation and monitoring of the execution of the statically linked binary.

FIGS. 13a-13e provide flow charts of processes to implement efficient strategies to transfer monitoring data from serverless/stateless service execution instances to external monitoring nodes.

Corresponding reference numerals indicate corresponding parts throughout the several views of the drawings.

DETAILED DESCRIPTION

Example embodiments will now be described more fully with reference to the accompanying drawings.

Visibility of process internal conditions, like process internal details describing performed transaction executions became a crucial feature for modern application performance and behavior monitoring systems, as it provides the high quality monitoring data that is required to identify and fix the root causes of observed performance and behavior related problems in modern, highly complex and adaptive service oriented applications. This grade of visibility is typically gained using in-process monitoring agents that operate in the processing context of the monitored process. Therefore, those agents are capable to access various process internal data sources which are out-of-reach for monitoring approaches that operate outside the processing context.

Those in-process agents are typically injected into starting processes using standard operating system services that resolve, provide and dynamically load common library functionality required by those processes. These injection mechanisms are ineffective for self-contained, statically linked processes that contain all required functionality in their respective process binary and therefore do not use the dynamic loading service.

Referring now to FIG. 1, which illustrates the current situation by comparing the startup sequence of a process 104 executing a statically linked binary, with the start sequence of a process 106, executing a dynamically linked binary.

An operating system 100, typically provides two execution spaces with different security restrictions. A user space 101 provides functionality to execute user defined processes like process 104 and 106. Security restrictions in user space are typically user-adaptable and may be specified strict or relaxed, according to the user requirements. The kernel space 102 of an operating system typically contains basic, common functionality to manage and access hardware resources like CPU, main and secondary memory, network connections etc., and functionality to manage the usage of those resources by processes (like 104 and 106) residing in user space 101. Security requirements for the kernel space are higher than for the user space, therefore typically also the security restrictions for kernel space activities are stricter than those for the user space. Especially, activities that manipulate the start of processes to e.g. inject in-process agent into starting processes may not be possible in kernel space. The kernel loader 103 is a specific kernel interface that provides services to load a binary, e.g. from a hard disk, into the main memory of the computer system for its execution in form of a process.

Process 104 was started using a statically linked binary by a binary execution request 130 for the statically binary that was sent to the kernel loader 103. The statically linked binary may contain library code 105. The kernel loader first analyzed the linking status of the binary to determine whether it is statically or dynamically linked. As the binary is statically linked, loading 131 of the binary is performed solely by the kernel loader. Loading and startup of the process is entirely managed in kernel space and thus provides no mechanism to inject an in-process agent.

Process 106 executes a dynamically linked binary. The startup of this process is also initiated with a binary execution request 120 to the kernel loader, followed by a determination of the linking status of the binary by the kernel loader 103. In this case, the kernel loader delegates 121 the loading of the binary to a dynamic loader 108. The dynamic loader is typically implemented as a user space functionality that also provides mechanisms to alter the provided dynamic loading service. One possible adaptation of the dynamic loader is the installation of an agent injector 111, which provides functionality to inject in-process agents into processes executing dynamically linked binaries.

On receipt of a delegated load request, the dynamic loader 108 first analyzes 122 the dynamic library references 107 contained in the binary that is going to be executed and then loads 124 the binaries 109 of the referred libraries in the process memory of the starting process. The agent injector 111 adapts the set of resolved and loaded libraries in a way that, in addition to all referred dynamic libraries, also an agent binary 110 is loaded into the starting process and executed as in-process agent 112. During the execution of process 106, the injected agent 112 generates monitoring data 125. The generated monitoring data may contain but is not limited to data describing the startup of the process and describing resource utilization parameters of the process, describing performance and functional parameters of transactions executed by the process and communication activities of the process. The generated monitoring data 125 may be sent to a remote monitoring server 112 via a connecting computer network 116. At the monitoring server, the received monitoring data may be processed by a monitoring data processor 113 and the processing results may, together with the original monitoring data, be stored 114 in a monitoring data repository 115. Monitoring data processing may contain but is not limited to creating and maintaining a topological model of a monitored environment, creating end-to-end transaction trace data out of fragment trace data received from different in-process agents, identification of abnormal operating conditions and the estimation of causal dependencies between different identified abnormal operating conditions.

Coming now to FIG. 2, which describes a mechanism to inject in-process agents into processes that execute statically linked binaries. Basically, the mechanism detects attempts to start statically linked binaries and redirects such attempts to start a proxy process instead. The proxy process launches a debug-controlled child process to load the statically linked binary. After the child process finished loading the binary, the proxy process copies the memory image of the child into its own memory image and terminates the child. The proxy process then loads an agent binary and uses it to instrument the transferred memory image of the statically linked binary. After the instrumentation process is finished, the entry point function of the (now instrumented) statically linked binary is called to start its execution.

A parent process 200, containing process logic and at least a minimal instrumentation consisting in at least a binary execution request interceptor 202, which replaces original calls to request the execution of a binary in a separate process is executed in the user space 101 of an operating system and performs a request 210 to execute a binary in another process. On Linux operating systems variants of the system call "execve" may be used to execute binaries in separate processes.

During its execution, the process logic 201 may perform a request 210 to execute a binary 207. This request is received by the binary execution request interceptor 202. A detailed description of the processing performed by the binary execution request interceptor on a received execution request can be found in FIG. 6. In a first step, the binary execution request interceptor determines 211 the linking status of the to be executed binary 207. Various meta data available in binary executable files may be used to determine its linking status. One example is e.g. the "INTERP" directive of Linux ELF binary execution files, which is a meta data entry that identifies the dynamic loader that should be used for the binary. If this entry is not present, the binary does not use dynamic loading/linking functionality and is therefore statically linked.

In case the binary is dynamically linked, the binary execution request interceptor forwards 212 the loading process to the kernel loader 103, as in this case the agent injection will be performed later by the agent injector 111 installed in the dynamic loader 108.

If the linking status is statically linked, the binary execution request interceptor suppresses the execution call for the binary and starts 213 a proxy launcher 203 instead as a separate process. The parameters of the command to start the proxy launcher contains all command line parameters of the original execution request and additionally name and path of the binary to which the original execution request was directed. The proxy launcher process executes proxy launcher logic 217, which creates a memory image of the statically linked binary in the memory assigned to the proxy launcher process. The proxy launcher logic additionally loads a monitoring agent 112 into the memory of the proxy launcher process, which then instruments the memory image of the statically linked binary that resides in the memory assigned to the proxy launcher process. After the instrumentation is finished, the proxy launcher logic 217 calls the entry function of the now instrumented memory image of the statically linked binary to start its execution.

The proxy launcher logic 217 analyzes 214 the original binary to determine whether execution of functionality located in the binary may cause a conflict or unexpected behavior when it is executed in the same process context with an injected agent. Agents may use functionality that rely on unique, shared resources like e.g. thread local storage functionality. Thread local storage provides storage of data that is accessible from different method executions performed by a single thread. To provide this functionality, specific, unique and shared resources, like specific registers are used. Various implementations of thread local functionality in different library versions may access and use this register in different ways and create expected and consistent results when used separately.

However, when different versions of the thread local functionality are executed in the same process, the individual usages of the shared resources by the different library versions are not coordinated, which may cause unexpected behavior as e.g. one version of the functionality may inadvertently alter or destroys data created by another version of the functionality.

If e.g. a statically linked binary uses thread local functionality from a statically linked binary and this statically linked binary is executed in a process in combination with an agent that also uses thread local functionality, a situation as described above, causing unexpected behavior may occur.

The conflict detection performed by the proxy launcher logic may be based on various types of meta data that is contained in the binary which indicates the existence of specific libraries in the binary. A detailed description of the conflict detection mechanism can be found in FIG. 10. Another, alternative or supporting strategy could be to reduce the "conflict surface" of the agent by e.g. not relying on standard functionality that is prone to such conflicts and to replace it with proprietary, agent specific functionality that does not rely on the same shared resources as the standard functionality.

If no conflict is detected, the proxy launcher logic 217 creates a debug-controlled child process which loads the statically linked binary in its process memory. The memory image 205 of the child process is then replicated to the process memory of the proxy launcher process. This replicated memory image may also contain statically linked libraries 206. The proxy launcher logic then terminates the child process and loads the agent 112 e.g. using dynamic linking features provided by the underlying operating system. The agent 112 may be used to instrument the memory image of the statically linked binary before its execution. The placed instrumentation may, together with the agent create monitoring data 125 describing the execution of the functionality of the statically lined binary.

A detailed description of the creation of the child memory image and its instrumentation by an agent is shown in FIG. 7.

In case of detected conflicts, the proxy launcher logic delegates 215 the binary execution request further to a minimal proxy launcher process 204, which executes minimal proxy launcher logic 218. The minimal proxy launcher logic 218 uses similar mechanisms as the proxy launcher logic to create a memory image of the statically linked binary, but other than the proxy launcher logic, the minimal proxy launcher logic contains no dynamic library loading functionality as it does not load an agent library into process memory. The minimal proxy launcher logic performs a minimal instrumentation of the created memory image, which only performs the instrumentation of binary execution requests with a binary execution request interceptor. The placed binary execution request interceptors ensure that all binary execution requests issued by the process logic of the conflicting statically linked binary are redirected to proxy launchers or minimal proxy launchers. This further ensures that all child processes that are launched by a process that is already instrumented with a binary execution request interceptor 202 (either by an injected agent or by a minimal proxy launcher) are also instrumented with a binary execution request interceptor. With this mechanism, process launch chains (process A launches child process B, which in turn launches child process C etc.) of arbitrary length can be handled by the agent injection mechanism. Each process in such a launch chain is automatically instrumented according to its conflict status (i.e. minimal instrumentation only containing binary execution request interceptors for conflicting binaries, and full instrumentation and in-process agent for non-conflicting binaries). Especially, if an already instrumented process starts a child process using a conflicting binary, and this child process then in turn starts its own child process using a non-conflicting binary, an agent would automatically be injected into this second child process.

It is noteworthy that the minimal proxy launcher may, in addition to a binary execution request interceptor 202, also insert other monitoring code, like sensors into a binary that conflicts with full agent functionality, as long as the inserted monitoring code does not conflict with the binary.

Before the minimal proxy launcher logic starts the execution of the conflicting statically linked binary it may sent a notification 216 to the monitoring server 112 that indicates a not instrumented process.

Referring now to FIG. 3 which provides exemplary process launch chains that can be traced using the technologies disclosed herein. Different variants of "root" processes 300a, 300b and 300c may execute on an operating system 100. Those "root" processes may contain at least a minimal instrumentation that replaces all calls to execute binaries with execution request interceptors.

"Root" process 1 requests the launch of a second process 304 using a statically linked binary which contains functionality that potentially conflicts with the agent. As a consequence, process 304 only contains minimal instrumentation placed by a minimal proxy launcher process that consists of binary execution request interceptors 305 for all calls performed by the binary executed by process 304 that request the execution of binaries in new processes. During its execution, second process 304 launches 310 a third process 313a, which executes a statically linked binary for which no conflicts with an agent were identified. Third process 313a is fully instrumented with an agent 112 by a proxy launcher process 203. The full instrumentation also contains the instrumentation of binary execution requests with corresponding request interceptors to also monitor the execution of statically linked binaries in sub processes launched 314a by third process 313a.

"Root" process 2 300b is also instrumented with at least a binary execution request interceptor 301. The process logic of the process requests the launch of a second process that executes a dynamically linked binary. A generic agent 307 is loaded into the process by the dynamic loader based injection mechanism, but a detailed analysis of the binary reveals that the technology used by the binary is unknow by the monitoring system and no appropriate technology specific agent is available. As no technology specific agent can be injected in process 306, only generic, low-level monitoring, performed by the generic agent is available. The generic agent also instruments binary execution requests with binary execution request interceptors 202. The placed binary execution request interceptor redirect requests to execute binaries and redirects 311 them to execute a proxy launcher process instead, which performs the instrumentation of processes executing statically linked binaries for which a technology type could be identified and for which no conflicts are detected. The statically linked binary executed by third process 313b, which is launched by second process 306, fulfills those requirements and is therefore instrumented with an agent 112. Subsequent binary execution requests 314b performed by the third process 313b and its child processes are also traced by this mechanism and all processes in this chain executing statically linked binaries with known technology and without conflicts are instrumented with an agent 112.

"Root" process 3 300c requests the launch of a dynamically linked binary in second process 308, but in this case, a user configuration permits the monitoring of the second process 308. In this case, a generic, technology independent agent may be injected, but this agent may not perform any monitoring activity, except the placement of binary execution request interceptors to follow subsequent processes launched 312 by second process 308, like a request to launch third process 313c, which is then again instrumented with an agent 112. The process launch chain 314c of third process 313c is also followed.

A similar situation occurs when second process 308 executes a statically linked binary and a user config exists that exempts the second process from monitoring. In this case, the binary execution request interceptor placed in "root" process 300c would redirect a call to execute the second process 308 to a proxy launcher process. The proxy launcher process would interpret and apply the user configuration and in case the user configuration suppresses instrumentation of the second process 308, redirect the launch request to a minimal proxy launcher process 204. The minimal proxy launcher process would only instrument binary execution request interceptors 202 in second process 308 to keep tracing of the process launch chain intact.

Coming now to FIG. 4 which provides a flow chart of a container configuration, in which a container manager process 401 is executed on an operating system 100 to provide operating system level virtualization and process isolation.

A container environment 404 provides a view of the resources of the underlying operating system like network connections, hard disks, main memory or CPUs. Further, the container provides isolation of processes running inside the container from processes running in other containers or on the underlying operating system. A container is typically specified by a container configuration which defines the resources that are visible inside the container and which also defines mappings between resource identifiers that are valid outside the container to container inside resource identifiers. Resource mappings may include but are not limited to network port mappings that map specific container external port numbers to container internal port numbers or file system mappings that map container external file systems and file system paths to container internal ones. In addition, a container configuration also specifies one or more executable binaries that should be executed on a container start.

A container manager process 401 typically receives a request to start a specific container configuration. On such a request, the container manager first creates the container 404 and sets up the resource view and the resource mappings that are defined in the configuration and afterwards starts the one or more initial container processes 405 specified in the container config.

A container manager agent process 400 may monitor 402 the activities of a container manager process to detect container starts. This monitoring may e.g. be performed using debug-control features of the underlying operating system. In variant embodiments the container manger agent may not be implemented as separate process but reside as in-process agent in the container manager process 401 and place instrumentations that intercept and manipulate container start activities.

In both cases, out of process and in-process container manager agent 400, the container manager agent detects 402 container starts performed by the container manager process 400 and manipulates those container starts by first adapting the resource view defined by the container configuration in a way that agent binaries and binaries of proxy launcher, minimal proxy launcher and all other binary executables and configuration files required for the placement of in process agents in processes executing statically or dynamically linked binaries are available inside the container.

In addition, the request performed by the container manager process 401 to start the one or more initial container processes 405 is intercepted and in case the binary to which the request is directed is statically linked, redirected to a request to start a proxy launcher process instead.

Typically, the container manager process uses a specific system call (e.g. the "execve" system call on Linux® operating system) to execute the first process in a container. This call typically contains parameters identifying the binary that should be executed (e.g. file system path and file name) and parameters defining command line parameters that should be passed to the starting binary. The container manager agent 400 may intercept those calls and in a first step determine the linking status of the binary that should be executed. In case the linking status indicates usage of dynamic loading functionality, the call may be left unchanged, as in this case agent injection is performed by an agent injector 111 installed in the dynamic loader 108.

When the call is directed to a binary with a linking status indicating static linking, the call may be altered by changing the parameter that identifies the binary that should be executed to a value that identifies the proxy launcher binary inside the container. The identification data of the binary to which the call was originally directed may be added to the call parameter specifying the command line that is used to start the proxy launcher process. This identification data of the original binary that was added to the command line may later be used by the proxy launcher logic.

Alternatively, the container manager agent may intercept loading of container configuration data by the container manager agent. The portion of the container configuration that specifies the binaries that should initially be executed in the container may be identified, and the linking status of the specified binaries may be determined. For identified statically linked binaries the corresponding start configuration may be altered by moving the identifier of the original binary to the command line and changing the name of the starting binary to the name of the proxy launcher binary. Those manipulations may be performed in a non-persistent way.

After the container 404 initialization and startup is finished, an initial container process 405, containing at least a binary execution request loader 408, that was either placed by a proxy launcher process, a minimal proxy launcher process or an agent injected by an agent injector is executing in the container. The process logic 406 of the initial container process may at some point request 407 the execution of another binary. This request is received by the binary execution request interceptor 408, which redirects it 409 to the proxy launcher process in case the binary to which the execution request is directed is statically linked or forwards the request unchanged 410 when the request launches a dynamically linked binary. Agents 112a, 112b and 112c are injected into initial container processes 405 and secondary processes 411 and 412, regardless of the linking status of the executed binaries (statically or dynamically linked). The injected agents may create monitoring data 125 and send it to a monitoring server 112 via a connecting network.

Coming now to FIG. 5, which provides a flow chart of the process performed by the container manager agent 400 to prepare a starting container for the injection of agents into processes executing statically and dynamically linked process in the container.

The process starts with step 500 when the container manager agent 400 detects the start of a container 404 by the container manager 401. Following step 501 adapts the container configuration to make agent libraries, proxy launcher and minimal proxy launcher binaries and all other files required for the injection of agents into processes executing statically and dynamically linked binaries visible and accessible in the container. The manipulations performed by step 501 may be performed in a non-persistent way. Original, persisted container configuration data may not be changed, only its in-memory representation or its application by the container manager may be changed.

Afterwards, step 502 may intercept the start of initial container processes. The linking status of the binaries that are used by those initial container processes may be analyzed to determine their linking status. For binaries with a linking status indicating dynamic linking, the process start may be continued unchanged. In case initial container processes use statically linked binaries, the start is redirected to start the proxy launcher binary instead of the original binary. The process then ends with step 503.

FIG. 6 provides a flow chart of the processing performed by a binary execution request interceptor 202 on receipt of a request to execute a binary in a new process. The process starts with step 600, when a request to execute a binary in a new process is received. Following step 601 analyzes the binary to which the execution request is directed. Typically, system calls are used to execute binaries in a separate process. Those system calls typically require a parameter that identifies the file containing the binary that should be executed in a file system. Step 601 may use this parameter to identify the binary that should be executed and then analyze the binary file and use metadata contained in the binary file, as described above, to determine its linking status. Following decision step 602 evaluates the linking status and in case it indicates dynamic linking, ends the process with step 605. If otherwise static linking is indicated, the process continues with step 603, which creates a command line for a proxy launcher process by combining the path to the statically linked binary with the command line that was intended to the start of the original binary. Goal of step 603 is to create a command line for the proxy launcher process that contains all information that is required by the proxy launcher logic to reproduce the start of the statically linked binary in a child process. Some operating system environments use the convention that the first command line parameter of a process contains the name of the started binary. In operating systems that follow this convention, step 603 may be obsolete as the received command line already contains all information that is required by the proxy launcher logic.

Afterwards, step 604 is executed, which executes the proxy launcher binary instead of the statically linked binary. Step 604 may e.g. change the call parameter of the received system call that identifies the binary that should be executed to point to the file system location of the proxy launcher and change the call parameter specifying the command line for the starting binary in a way that it contains information to identify the binary to which the call was directed in addition to original command line parameters. Step 604 then executes the system call using the changed parameters to start a process executing the proxy launcher instead of the original binary. The process then ends with step 605.

FIGS. 2 and 3 show binary execution request interceptors that are implemented in form of instrumentation that is placed in process binaries executed in the user space of an operating system. Those variants intercept requests to execute binaries on the caller side.

Other variant embodiments may use callee instrumentation, which adapts the functionality of the kernel side handling of binary execution requests. Those variants may e.g. provide kernel extension modules that place kernel side instrumentation that redirects calls received by the kernel to execute binary execution requests to a binary execution request interceptor. However, such variants change the behavior of fundamental kernel functionality and therefore pose a higher risk. In addition, the installation of kernel extension typically requires additional interaction with/approval from an end user/owner of the monitoring system which is may not be desired.

The processing performed by the binary execution request handler would be identical for process/user space and kernel space instrumentation placement, the only difference is that process side instrumentation requires an instrumentation of all processes that perform binary execution requests, whereas kernel side instrumentation requires to only instrument those kernel side functionalities that handle binary execution requests.

Referring now to FIG. 7 which provides a flow chart of the processing performed by the proxy launcher logic to instrument a statically linked binary with an agent.

The process stars with step 700, when the proxy launcher process gets started, e.g. due to a request for the execution of a statically linked binary that was redirected by a binary request interceptor to launch the proxy launcher instead of the binary. The command line that is used to start the proxy launcher contains both the command line that was intended to start the original binary and identification data for the location of the original binary, e.g. on a hard drive of the underlying operating system.

On start, the proxy launcher process 203 loads the proxy launcher logic 217 into an address range for which address conflicts with conventionally statically linked processes are unlikely. Typically, executable binaries are created using linker tools that assigns memory addresses to code. When the binaries are loaded for execution in a process, the code is loaded at the address space specified by the linker. Linkers typically provide a base address configuration that defines the area in which the code should be located. This base address may be used to locate the functionality of the proxy launcher logic in a specific, uncommon address area that is most probably not used by conventional statically linked binaries.

In following step 701, the proxy launcher logic analyzes the original binary to identify its technology type and do determine whether functionality used by the binary may cause a conflict with functionality use by the agent. Step 701 may also check other conditions that prevent the full instrumentation of the binary, like e.g. a user configuration that excludes the binary from being instrumented.

Following decisions step 702 verifies whether reasons to not fully instrument the statically linked binary were identified by step 701. In case the binary should not be fully instrumented, the process continues with step 714, which notifies a not instrumented process 714. This notification may e.g. inform a user of the monitoring system about the not instrumented and therefore not monitored process. This notification may also contain a reason why the process is not instrumented, like the detection of a potential conflict, or a user configuration that exempts the process from instrumentation. Following step 715 forwards the process start request to a minimal proxy launcher process 204, which executes minimal proxy launcher logic 218 that starts the statically linked binary with a minimal instrumentation that is required to trace process start chains including statically linked binaries. The processing performed by the minimal proxy launcher logic is shown in FIG. 8. After step 715 the process ends with step 716.

In case no reasons against a full instrumentation of the binary where identified, step 704 is executed in which the proxy launcher logic starts a debug-controlled child process. On Linux® operating systems, PTRACE functionality may be used to establish the control connection to the child process. The proxy launcher logic may transfer the command line for the original binary and the identifier of the original binary to the child process. Standard functionality provided by the underlying operating system to support starting of child processes may be used to transfer this data from the proxy launcher process to the child process.

In step 705 the child process establishes the debug-connection to its parent process (the proxy launcher process) and waits until the parent process acknowledges the debug connection.

In following step 706 the proxy launcher logic acknowledges the debug connection and configures a condition to wait for a notification of the child process that indicates that loading of a binary for execution by the child process is finished.

After the child process received the acknowledgement from its parent process, it executes step 707, which uses the received identifier for the original binary and the command line intended to the start of the original binary to load the original binary into its process memory. This replaces all previous content of its process memory with content from the original, statically linked binary. After this step, the memory image of the child process looks exactly like the memory image of a standalone process that loaded the statically linked binary for execution. After loading the statically linked binary is finished, the child process stops execution and notifies its controlling process (the proxy launcher process).

In step 708, the proxy launcher logic 217 receives the notification that the child process has finished loading the original binary and afterwards starts to read the memory image of the child process and reproduces it in its own process memory. A detailed description of this process can be found in FIG. 9.

After the process image of the child process is transferred to the proxy launcher process, the proxy launcher logic terminates the child process in step 709 and in subsequent step 710 loads the binary of a technology specific agent that matches the technology used by the statically linked binary. The proxy launcher logic may use dynamic loading mechanisms provided by the underlying operating system to load the technology specific agent library.

In following step 711 the loaded technology specific agent may instrument the memory image of the code of the original binary with sensors that create measurement data describing activities performed by the code of the original binary. The created measurement data may contain but is not limited to performance measurement data, execution failure indication data, resource utilization data and transaction tracing data.

Afterwards, step 712 is executed which identifies the entry point function of the original binary and reconstructs the context situation that the original binary would have received on a conventional start. The entry point of a binary is the function that is executed after the operating system has finished all preparations to execute the binary (e.g. creating a process, loading the binary into the memory of the process etc.). With the call of the entry point or entry function, the operating system passed control from preparation functionality required to create the context for the execution of the binary, to the actual execution of the binary. The context situation of an entry point may consist in a stack layout that represent the name of the binary and its command line. Step 712 may create a stack layout that is identical to the stack layout that the binary would have seen on a conventional start before calling the entry function.

After step 712, the execution of the original binary is started, and the agents starts monitoring this execution with step 713. The process then ends with step 716.

In some variant embodiments, the proxy launcher logic may use functionality that is similar to the kernel loader functionality to reproduce the memory image of the original binary instead of a debug-controlled child process. The required functionality would enable a process to additionally load binaries in its process memory image without losing its own memory image and without transferring control to the new loaded code. This functionality would allow a caller to "merge" its memory image with the memory image of new loaded binary. In such embodiments, steps 703 to 709 would be replaced by the "merge" functionality. Although this approach may be more efficient than the child-process based approach because it does not require a separate process and inter-process communication, the task of re-implementing a variant of the kernel-loader functionality may be too complex to create an always reliable solution.

Coming now to FIG. 8 which provides a flow chart of the processing performed by the minimal proxy loader 205 in the receipt of a request to execute a statically linked binary. The process starts with step 800 when the minimal proxy launcher process 204 is started with a command line containing the original command line intended to start the original binary and identification data for the original binary. In subsequent step 801, the minimal proxy launcher logic 218 creates the memory image of the statically linked binary in a child process. Step 801 may e.g. execute steps 704-708 of the process described in FIG. 7 to create the memory image in the child process. In following step 802 the minimal proxy launcher logic reproduces the memory image of the child process in the memory assigned to the minimal proxy launcher process. Details of step 802 can be found in FIG. 9.

Afterwards, step 803 kills the child process.

In following step 804, the minimal proxy launcher logic analyzes the memory image of the original binary to identify calls to execute binaries in child processes (e.g. on Linux® operating systems this would include identifying calls to the "execve" function.). Identified calls may be replaced by calls to binary request interceptor functionality as described in FIG. 6. After step 804, it is assured that all calls of the original binary that cause the execution of other statically linked binaries are redirected to the proxy launcher binary, which assures that also those binaries are instrumented with an agent if this is possible or, in case placing an agent is not possible, are at least instrumented with binary execution request interceptors.

In subsequent step 805 the minimal proxy launcher logic identifies the entry point of the original binary, reconstructs the context/stack situation that a conventional launch of the original binary would have caused and then calls the identified entry point. The process then ends with step 806.

Coming now to FIG. 9, which provides a flow chart of a process to reproduce the memory image of a debug-controlled child process in the process memory of its controlling parent process (i.e. a proxy launcher process or minimal proxy launcher process), as e.g. performed by the proxy launcher logic or the minimal proxy launcher logic.

The process starts with step 900, when a memory image that should be transferred has been created in a child process. Following step 901 analyzes the memory addresses allocated by the memory image of the child process and compares them to the allocated memory addresses of the parent process (proxy launcher or minimal proxy launcher process) to identify memory address conflicts. A memory address conflict occurs when memory addresses allocated in the memory image of the child process are also allocated in the memory image of the parent process. This may e.g. be the case when proxy launcher logic 217 uses memory addresses that are also used by the memory image of the child process. In case of an identified memory address conflict decision step 902 continues the process with step 903 which redirects the execution to an alternative proxy launcher process or minimal proxy launcher process with an alternative memory layout which does not conflict with the memory image of the child process. More precisely, step 903 may start a variant of a proxy launcher/minimal proxy launcher which contains the same functionality or logic but where the code that provides the functionality or logic is located at other memory addresses that do not conflict with the memory addresses allocated by the child process. The processes described in FIG. 7 or 8 may then be executed with this variant proxy launcher/minimal proxy launcher process, which also includes another execution of the process of FIG. 9. The process then ends with step 904.

In case no memory address conflict is detected, the process continues with step 905, which analyzes the memory image of the child process to identify portions that are still identical with portions of the binary on the hard disk and portions that have been altered since they were loaded into memory. Step 905 may, on Linux operating systems, use metadata describing the child process memory status that is stored in the "/proc/[pid]/" folder in the "smaps" or "pagemap" file to determine which portions of the memory image are still consistent with corresponding portions of the binary file. The path fragment "[pid]" is a place holder for a specific process identifier (PID). The "smaps" or "pagemap" file may contain records describing portions of memory assigned to the process that may e.g. be defined by a start and an end address for the specific portion. Those records may also contain data indicating a deviation of those memory portions form the corresponding portions of the binary files from which they are loaded. As an example, such records may contain a field "Shared_Dirty" or "Private_Dirty", which indicate that the memory portion deviates from its corresponding portion of the binary. Those fields may be used by step 905 to identify modified and unmodified portions of the child process's memory image.

Subsequent step 906 reproduces those portions of the child memory image for which no modification was detected by mapping the corresponding areas of the binary file into the target process memory and following step 907 reproduces the modified portions by copying the modified portions from the child memory image to the target memory image. Steps 906 and 907 may be executed in arbitrary order or concurrently. After step 906 and 907 are finished, the memory image of the child process is reproduced in the memory image of the controlling process. The process then ends with step 908.

Referring now to FIG. 10, which contains a flow chart of a process that may be used to identify the technology type of a statically linked binary and further to determine whether the statically linked binary contains functionality that potentially causes a conflict with agent functionality. This process may e.g. be performed by the proxy launcher logic 217 to determine technology type and the possibility of a conflict.

The process starts with step 1000, when a statically linked binary is received for analysis. Following step 1001 fetches header and metadata of the received binary for analysis. On Linux® operating systems, executable binaries are stored using the ELF file format, which defines a file structure that contains various metadata elements. As an example, the binary may contain generic, technology independent metadata like e.g. symbol information. Symbol information maps machine-readable function definitions with human readable function names and machine-readable storage locations for variable or constant values with human readable variable or constant names. Those human readable names may be analyzed in step 1002 to determine whether libraries containing potentially conflicting functionality are used. Symbol information may also be used by step 1002 to determine the technology type of the binary.

As concrete example, step 1002 may analyze the symbol information stored in the ".symtab" section of a Linux® ELF binary to determine whether it contains a symbol "runtime.iscgo". This symbol is indicative for binaries that are based on the GO® programming language and it identifies a global Boolean constant that determines whether the C language interfaces that are provided by the GO® environment should be initialized. After a "runtime.iscgo" symbol was found by step 1002, which indicates GO® technology, step 1002 may continue by using the value storage information of the symbol entry to read the value of "runtime.iscgo" from the binary. A value of this constant that indicates the usage of the C language interface also indicates a conflict with agent functionality. If analysis of generic metadata resulted in a determined technology type and conflict status, decision step 1003 continues the process with step 1009 which provides the determined technology type and conflict status. The process then ends with step 1011.

Other variants of step 1002 may instead or in addition to the above described analysis of symbol information also use other binary meta data, like for ELF binaries, the data stored in a SHT_NOTES section of the binary. This section may, for GO binaries, contain an ".go.buildinfo" entry. The existence of this entry may be used for (GO) technology type detection. The value of this entry, which contains information describing the settings that were used to build the binary, may contain data indicating whether the C language interface is used by the binary and may therefore also be used for conflict detection. Step 1002 may in addition scan the ELF binary for the existence of sections that indicate the usage of the C basis library "libc" to determine the existence of a conflict. As an example, step 1002 may search for a "_libc_atexit" section which indicates the usage of a variant of this library In case either conflict status or technology type could not be determined, step 1004 is executed which fetches technology specific metadata from the binary which is followed by step 1005 to analyze the technology specific metadata. Technology specific metadata consists in sections of an ELF binary that are characteristic for a specific technology. As an example, only binaries that are based on the GO® programming language may contain a "GO" section, therefore the existence of a "GO" section may be used as an indicator that the used technology is the GO programming language. An example for conflict detecting based on technology specific metadata, also for the GO technology may, after GO was determined as technology type, fetch a GO technology specific symbol table that is stored in a GO specific section of the binary and search this symbol table for functions that indicate the existence of potentially conflicting functionality in the code. Such a conflict detection mechanism may e.g. scan the GO symbol information for a function with the name "cgo_init", which initializes the C language basis library which contains potentially conflicting functionality.

In case both technology type and conflict status are determined after step 1005, following decision step 1006 continues the process with step 1009. Otherwise, step 1007 is executed which scans the whole binary for technology type specific patterns, like string values that are characteristic for a specific technology.

Step 1007 may also perform an entry point analysis of the binary to determine the technology type. The binary metadata typically contains data describing the location of the entry point. As an example, the Linux® ELF binary format specifies a header entry "Entry point address" which points to the entry address. The instruction at the entry address is the first instruction of the binary that gets executed.

As the entry point represents the starting point of the technology specific functionality contained in the entry point, the code that is executed at this entry point is often characteristic for a specific technology type, therefore analyzing the entry point code may also reveal the technology type of a binary. As an example, a hash value may be calculated for a sequence of entry point instructions that are specific for a certain technology. This hash value may then be used as reference value. During entry point analysis, another hash value may be calculated using the entry point code of the analyzed binary and the calculated hash value may be compared with a reference value. A match of the calculated hash value with a reference value may be used as an indicator that the analyzed binary is of the technology type corresponding to the reference value.

Entry point analysis may also be used for conflict detection. In case e.g. previous meta data based analysis indicated a certain technology type, but the entry point analysis indicated no match for this technology type, this an indication that in addition to the standard initialization procedures of the technology type, other initialization procedures of functionality that is potentially conflicting with the agent may be performed. In such situations, a conflict may be reported, even if previous meta data based analysis indicated no conflict.

If conflict status and technology type were determined after step 1007, decision step continues with step 1009. If either technology type or conflict status is still not determined, the process continues with step 1010 which indicates undetermined conflict status and technology type. The process then ends with step 1011.

Coming now to FIG. 11, which shows a flow chart that describes the manual agent injection preparation for a statically linked process that may be performed by a human user. The process starts with step 1100, when a user identifies a statically linked binary for which instrumentation with an agent is desired. In following step 1101, the user replaces invocations of the statically linked binary with invocations of the proxy launcher binary and in step 1102 adapts the command line of those invocations by including the location of the original binary. After those changes, the proxy launcher binary is invoked instead of the original binary. The proxy launcher process that is started with this invocation also receives all data required to start and instrument the original binary in its command line. The process then ends with step 1103.

Coming now to FIG. 12, which provides exemplary visual representations of the memory map of a proxy launcher process 203 and a spawned child process during various stages of the instrumentation process.

Memory map of proxy launcher and child process are displayed during four phases of the agent injection process, where the first phase 1201 represents start and initialization of the proxy launcher process, the second phase 1202 describes the spawning of the child process and loading of the original statically linked binary into the memory map of the child process, the third phase 1203 shows the result of the merge process that merged the memory map of the child process into the memory of the proxy launcher process, and finally phase four 1204 which represents the state after the agent is dynamically loaded into the merged memory map of the proxy launcher process.

In this simplified example, the address space of process memory starts with address 0x000000 and ends with 0xFFFFFF. The "0x" prefix indicates hexadecimal numbers which are common for the notation of computer memory addresses.

On the start of the proxy launcher process 204, its payload functionality 1211 (i.e. the functionality that starts and controls the child process, performs the memory merge and afterwards the loading of the agent, also referred to as proxy launcher logic 217), is loaded into a memory address area 1211 of its assigned memory area 1205 for which a conflict with the memory layout of conventionally created statically linked binaries is unlikely. Typically, various tools are involved in the creation of binary executables. One of these tools is a linker tool which links code fragments created by compiler tools into whole executable binary files. Those linker tools typically also provide means to specify the location of code in the memory space of the created binary file. Typically, linker tools e.g. provide an optional "base address" configuration parameter to specify a lower bound for the memory address area into which functionality of the binary should be loaded. Generally, this base address is not relevant for the functionality of a binary. Therefore, this linking option is typically not set, and the linker uses a default base address. During linking of the proxy process binary, a specific base address may be used, that significantly differs from the default base address of the linking tool. This locates the code of the proxy process logic 217 in a memory area that is most probably not used by conventionally linked binaries.

The proxy launcher logic also requires dynamic loading interface functionality 1212, which may later be used to dynamically load agent functionality into a memory area 1213. This dynamic loading functionality 1212 is typically located dynamically by functionality that is not controllable by a provider of process binaries to a free area in the memory address space. Typically, this functionality is also located in a memory area for which conflicts with other binaries are unlikely. Still, the memory location of this dynamic loading interface functionality 1212 may become problematic, especially as it cannot be controlled by the provider of the proxy process. To overcome such situations, a proprietary version of the dynamic loading interface functionality may be provided and integrated into the proxy launcher logic.

Next to the proxy launcher functionality 1211 and the dynamic loading functionality 1212, no other code is loaded to the memory of the proxy launcher process, therefore the rest of its memory area remains free 1210.

In the next phase, the proxy launcher logic 217 operates to spawn a debug-controlled child process with a separate memory area 1206. The child process loads the original statically linked binary into its memory. The memory layout of the statically linked binary may contain an entry function area 1220, a domain functionality area 1221 and an area for optional libraries 1222 that are contained in the binary. The proxy launcher logic uses the debug-control to halt the child process after the original statically linked binary is loaded into its memory area 1206 and before the execution of the loaded original statically linked binary is started.

The result of the next phase is a combination of the memory images of child process 1206 and proxy launcher process 1205 in the memory image of the proxy launcher process 1205. The proxy launcher logic 217 has reproduced the memory areas 1222, 1221 and 1220 of the child process that contain functionality of the original statically linked binary into corresponding memory areas 1222a, 1221a and 1220a of the proxy launcher process. The reproduction process may keep the address layout of the child process. Code allocated in a memory area ranging from address X to address Y in the child process may also be placed in a memory area ranging from the same address X to Y in the memory of the proxy loader process. At the end of phase 3, the child process may be terminated and its memory area 1206 may be freed.

In the final phase 4, the proxy launcher logic 217 dynamically loads an agent 112 into a memory area 1213. The dynamic loading functionality 1212 used to load the agent is aware of already occupied memory areas like area 1220a, 1221a, 1222a, 1212 and 1211 and loads the agent 112 to a still available memory location. After the agent 112 is loaded, it may first instrument the memory areas corresponding to the functionality of the original statically linked binary (1220a, 1221a and 1222a), before the proxy launcher logic 217 starts the execution of the functionality of the statically linked binary by calling its entry function 1220a.

Coming now to FIGS. 13a to 13e, which provide flow charts of processes that describe strategies for the efficient transfer of monitoring data describing functionality that is executed in stateless execution environments.

Stateless execution environments gain more and more popularity in the application development area, as they relieve the application vendor from the burden to provide a working execution environment for its application. The provision of an execution environment is separated from the provision of application functionality. Providers of stateless execution environments provide "on demand" execution environments that are dynamically created and destroyed based on execution requests for specific services. Those execution environments may also be referred to as stateless instances. Load balancing, execution elasticity that adapts to changing load situations and features required for the operation of functionality are provided by execution environment providers. The application provider only needs to provide the code for the services that in cooperation create the desired application functionality. The stateless execution environment uses stateless instances to execute service code.

To execute applications in stateless execution environments, application providers typically register code portions that provides a specific service and a request identifier (e.g. an URL) which may be used to request the specific service. The stateless execution environment may configure a load balancing entity that is capable to receive requests for the service. On receipt of a request for such a service, the load balancer may first check whether an idle stateless instance (i.e. a stateless instance that is currently not serving a request) is available. In case an idle stateless instance is available, the request is directed to it. Otherwise, the load balancer may either immediately create a new stateless instance that is configured with the code for the requested service, or it may wait for a specific time for a currently busy stateless environment becoming idle and thus ready to serve the new request, before it creates a new stateless instance. Stateless instances follow a life cycle that is defined by timeout configurations and request frequency. When a new request is received and no stateless instance is available to process the event, a new stateless instance is created to serve the request. After the request is processed, the stateless instance is transferred in an idle mode, in which it requires no or only minimal computing infrastructure and from which it can quickly be retransferred to an active state when a new matching request is received. When no new request is received for a specific time after the stateless instance was put into idle mode, the stateless instance will be destroyed to free the resources it allocates. A new stateless instance is created for a new request that is received after the timeout is elapsed.

FIG. 13a illustrates the life cycle of a stateless instance that executes service code which is instrumented with an agent. The agent monitors the execution of the service code and creates monitoring data describing this execution.

The process starts with step 1300, when a new request for a service is received for which currently no idle stateless instance is available. Following step 1301 instantiates a new instance and starts an agent in the new instance which instruments the service code. Afterwards step 1302 executes the instrumented service code which creates monitoring data. After the execution is finished, the agent may transfer the generated monitoring data to an external monitoring data consumer. Afterwards, the instance is suspended in step 1303 and waits for the next request. Decision step 1304 monitors the elapsed time since the last request that was served by the instance. In case a new request is received before the threshold is reached, the process continues with step 1302. If otherwise no new request is received before the threshold time is elapsed, the process continues with step 1305 which terminates the instance together with the injected agent. A new instance will be created on the next received request. The process then ends with step 1306.

As the usage of stateless execution environments is typically billed according to the time during which stateless instances were in the active state (i.e. serving requests) and according to the network activity caused by service executions (overall data sent into and out of the execution environment and data transferred between services executed by the execution environment), it is desired that both the additional instance execution time caused by the agent and the network traffic caused by the transfer of monitoring data from agents to external monitoring data processing nodes is minimized.

The monitoring data transfer strategy described in FIG. 13a is not optimal in both aspects. First, it sends the monitoring data after the service execution is finished, thereby extending the activity time of the instance and in turn causing additional costs, and second because it sends monitoring data for each service invocation separately, leading to a weak payload/overhead data ratio for the transferred monitoring data (relatively small network packets, containing a high percentage of overhead data like network management data compared to the transferred monitoring data).

Following FIGS. 13b to 13d propose strategies to optimize the resource usage of monitoring agents in stateless execution environments. Estimate data for the execution frequency of stateless instances and configuration data of stateless instances like e.g. the idle timeout configuration may be monitored and used as input to select an appropriate monitoring data sending strategy for the current load situation.

FIG. 13b provides a flow chart for a serial monitoring data strategy, where monitoring data sending is performed after the processing of the payload request is finished. This strategy may be used for low-frequency requests, where the time between consecutive service requests is above the suspension timeout and each request is handled in a new instance. In such situations, the only option is to send out the monitoring data right after the processing of the request is finished, as the instance will most probably never get activated again.

The process starts with step 1310, when a new request is received. In following step 1311 the request is processed by the instrumented service code that is executed by the instance. The agent monitors the execution and generates monitoring data.

In following step 1312 the agent delays the suspension of the instance until the generated monitoring data is sent to a monitoring data consumer. In addition to monitoring data, the agent may also send meta data that is required to interpret the monitoring data. As an example, monitoring data may consist of the execution time of a specific method and meta data may consist of the name and signature of the specific method.

After the monitoring data is sent, the process ends with step 1313. The instance executing service and agent may afterwards suspended and after the suspend timeout time is elapsed, terminated (not shown).

FIG. 13c contains a flow chart of a process for a parallel monitoring data sending strategy. This strategy is based on the fact that in high-frequency scenarios, instances are typically reused for multiple requests. In such a scenario, the agent is not forced to send monitoring data immediately. The agent may accumulate monitoring data from multiple requests and send the monitoring data based on efficiency criteria. As one example, the agent may send monitoring data in parallel to ongoing service executions to minimize the additional instance activity time caused by the monitoring data sending activity. As another example, the agent may send larger packets of monitoring data which results in a better payload/overhead ratio for the transferred monitoring data. And finally, the agent may reduce the amount of transferred meta data by creating identifiers for monitoring data and in a first step only sending those meta data identifiers to a monitoring data consumer. The monitoring data consumer may maintain a meta data map that maps meta data identifiers to meta data entries. On receipt of meta data identifiers, the monitoring data consumer may first try to resolve meta data entries for received meta data identifiers using its meta data map. For those meta data identifiers that could not be resolved by the monitoring data consumer, a request containing the unresolved meta data identifies may be sent to the agent. The agent may respond with a message containing the unresolved meta data identifiers and their corresponding meta data entries. The monitoring data consumer may use the received meta data entries and also insert them to its meta data map. This mechanism incrementally fills the meta data map on the monitoring data consumer, which over time minimizes the required requests to resolve unknown meta data identifiers.

The process starts with step 1320, when startup of an instrumented instance is finished and it starts to handle incoming requests. In followings step 1321, the agent starts monitoring the request execution and stores the monitoring data in a buffer that survives the suspension of the instance. Depending on the level of the performed suspension, the monitoring data may be held in main memory if the memory state of the instance is preserved during a suspension. If the main memory is cleared during a suspension, the buffer may be held in a persistent storage of the instance, like a file in a file system that is accessible by the instance that is not cleared during its suspension.

Following decision step 1322 checks various criteria to determine whether the content of the monitoring data should be sent. Those criteria may contain but are not limited to the filling level of the monitoring buffer, the time elapsed since the last sending of monitoring data or observed changes in the execution frequency of the monitored service.

In case buffer send criteria are not met, the process ends with step 1326. Otherwise step 1323 is executed which sends the buffered monitoring data and meta data identifiers (also referred to as meta data keys) to a monitoring data consumer. The monitoring data consumer replies with a response containing meta data identifiers it could not resolve. In case the response contains at least one unresolved meta data identifier, decision step 1324 continues with step 1325 which sends the meta data values for the received meta data identifiers. After step 1325, or if no unresolved meta data identifiers where received, the process ends with step 1326.

It is noteworthy that steps 1322 to 1325 may be executed concurrently to the execution of the payload request. As monitoring and meta data sending activity can now be performed in parallel to payload request handling, the execution time overhead caused by monitoring data sending can be eliminated or at least minimized.

The serial sending strategy is best suited for low-frequency services and the parallel sending strategy is appropriate for high-frequency scenarios. Following FIGS. 13*d* and 13*e* provide flow charts of process variants that may be used to determine the current request frequency situation and to switch to the appropriate sending strategy.

FIG. 13*d* provides a flow chart that is based on observation data generated by the agent only, and that only performs one switch from serial execution to parallel execution.

The process stars with step 1330, when the agent deployed to a stateless instance gets initialized (i.e. when the stateless instance gets initialized as e.g. in step 1301 of process 13*a*). During initialization, the agent may register itself with a monitoring data consumer with a registration request. The monitoring data consumer may reply a response that contains overall instance type and request frequency data for the type of the service provided by the starting stateless instance. A stateless execution environment may execute multiple instances that provide the same service functionality in parallel, e.g. to increase the overall request handling capacity of the system. Stateless instances that provide the same service may also be referred to as stateless instances of the same type. As agents are deployed to all stateless instances and those agents send registration requests to a monitoring data consumer, the monitoring data consumer is aware of the quantity of instances that are running for each instance type. As those agents also send monitoring data describing individual service executions, the monitoring data consumer also has execution frequency data for individual service instances and for service types.

On the registration of an agent, the agent may also send data that identifies the type of service that is provided by the stateless instance to which it is deployed and the receiving monitoring data consumer may reply a response that contains data describing the current load situation for the service type (i.e. number of instances of the service type, minimum/maximum/average request frequency of service instances of the specific type). The agent may use this load data in decisions step 1331 to determine if the current overall load situation qualifies to switch to a parallel monitoring data sending strategy at startup. On overall load situation data that indicates a high-frequency service type (i.e. high number of instances providing this service and high average request frequency) the agent may immediately switch to the parallel strategy. In this case, step 1334 is executed which activates the parallel sending strategy and the process ends with step 1335.

If otherwise the received overall load situation data indicates a low-frequency scenario, the process may continue with step 1332 in which the agent monitors the number of survived payload executions. The agent may e.g. maintain a persistent counter that counts service invocations. If the instance to which the agent is deployed gets reactivated after suspension, the counter is incremented. In case the instance is recycled, a new agent is deployed to a new instance which starts a new counter. The number of survived suspensions can be used by the agent to determine whether a switch to the parallel sending strategy is appropriate. Decision step 1333 may analyze the number of service requests processed by the instance (which corresponds to the number of survived suspensions), and in case this number exceeds a certain threshold, continue with step 1334 which switches to the parallel sending strategy. Otherwise, the process continues with step 1332.

FIG. 13*e* provides the flow chart of a process that also uses configuration data of the stateless execution environment in which a monitored application is running, like e.g. a suspension timeout configuration, which specifies the time after which suspended stateless instances are terminated, to select an appropriate strategy to send monitoring data.

The process starts with step 1340, when a new stateless instance is started and initialized and also an agent that is deployed to this instance is initialized. Agent initialization also contains its registration with a monitoring data consumer. The monitoring data consumer may return a registration response that contains, next to data describing the overall load situation for the service type provided by the starting stateless instance, configuration for the starting stateless instance that e.g. contains the suspension timeout for the instance. Configuration data for stateless instances may not be accessible from inside a stateless instance, but operators of stateless execution environments may provide interfaces to access this configuration data. An external monitoring data consumer may access those interfaces to fetch this configuration data and then forward it to an agent deployed to a stateless instance on its registration.

Subsequent decision step 1341 analyzes the overall load situation data the agent received on its registration to determine whether the load situation is appropriate for a parallel sending strategy. In case the load situation is appropriate for parallel sending, the parallels sending strategy is selected and the process continues with step 1344. If otherwise serial sending is appropriate, the serial sending strategy is selected and the process continues with step 1342. Step 1342 and decision step 1343 monitor and analyze the number of survived service requests to determine when a switch to a parallel sending strategy is indicated (as already described in FIG. 13*d*). In case a switch to parallel sending is indicated, the process continues with step 1344.

In step 1344, the agent monitors the average time between service requests received by the stateless instance and compares this average time with the suspension timeout. The agent may e.g. calculate a moving average for the duration between a specific number (e.g. 5, 10, 50) of last requests. The agent may e.g. maintain a persistent time stamp list for the last n requests to calculate this moving average.

In case the average time between requests is less than the suspension timeout and the difference between average time between requests and suspension timeout is greater than a specific threshold (i.e. the time between requests could still increase for the value of the threshold before the instance will be terminated), decision step 1345 continues with step 1347, which switches to the parallel sending strategy. In case the average time between service requests becomes greater than the suspension timeout minus the threshold, (i.e. the risk that the instance gets terminated due to a lack of service requests is increased), the process continues with step 1346 which switches back to the serial sending strategy. After step 1346 or 1347 the process continues with monitoring the average time between requests in step 1344.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented system for injecting agents into processes executing on a host computer, comprising:
   a given binary available for execution of the host computer; and
   an interceptor instrumented in a first process running under an operating system on the host computer and configured to receive a request to execute the given binary, wherein the interceptor analyzes the given binary to determine linking status and, in response to a determination that the given binary is statically linked to, launches a proxy launcher in a proxy process of an execution environment managed by the operating system;
   wherein the proxy launcher copies a memory image of the given binary into a memory assigned to the proxy process, loads a monitoring agent into the proxy process and starts execution of the memory image of the given binary in the proxy process, where the proxy launcher is implemented by executable instructions stored in a non-transitory data store of the host computer and the monitoring agent instruments the memory image of the given binary in the proxy process, monitors execution of the given binary and sends performance data describing execution of the given binary across a network to a monitor server.

2. The system of claim 1 wherein the interceptor launches the proxy process, where the parameters of command to start the proxy launcher includes name of the given binary and path for the given binary.

3. The system of claim 1 wherein the proxy process launches a child process for executing the given binary, such that the memory image of the given binary is copied into a memory assigned to the child process.

4. The system of claim 3 wherein the proxy launcher is configured to receive a notification regarding the loading of the memory image for the given binary and, in response to receiving the notification and prior to execution of the given binary in the child process, copies the memory image for the given binary into a memory assigned to the proxy process.

5. The system of claim 4 wherein the proxy launcher initiates a debug connection to the child process and copies the memory image for the given binary into the memory assigned to the proxy process using the debug connection.

6. The system of claim 1 wherein the proxy process is configured to dynamically load libraries.

7. The system of claim 1 wherein the monitoring agent installs a second interceptor in the memory image of the given binary in the proxy process, where the second interceptor is configured to receive a request to execute another binary and analyzes the another binary to determine linking status.

8. The system of claim 3 wherein, upon launch and prior to launching the child process, the proxy launcher determines whether functionality of the given binary conflicts with functionality of the monitoring agent.

9. The system of claim 8 wherein the proxy launcher copies the memory image of the given binary into a memory assigned to the proxy process, loads the monitoring agent into the proxy process and starts execution of the memory image of the given binary in the proxy process only in response to a determination that functionality of the given binary does not conflict with functionality of the monitoring agent.

10. The system of claim 9 wherein, in response to a determination that functionality of the given binary conflicts with functionality of the monitoring agent, the proxy launcher launches a minimal proxy launcher in a minimal proxy process of an execution environment managed by the operating system, wherein the minimal proxy launcher copies a memory image of the given binary into a memory assigned to the minimal proxy process and instruments the memory image of the given binary with a third interceptor, where the third interceptor is configured to receive a request to execute another binary and analyzes the another binary to determine linking status.

11. The system of claim 8 wherein the proxy launcher determines whether functionality of the given binary conflicts with functionality of the monitoring agent by analyzing metadata of the given binary or scanning a sequence of bytes comprising the given binary.

12. The system of claim 1 further comprises a container manager agent configured to detect creation of a container by a container manger process in an execution environment on the host computer and configures the container to support injection of agents into processes running in the container by making libraries which contain executable code for the agent and files which contain executable code for the proxy launcher accessible inside the container, where processes running in the container are isolated from processes running directly on the operating system using operating-system level virtualization.

13. The system of claim 12 wherein the container manager agent intercepts calls of the container manager process to execute the given binary in a given process running in the container and determines linking status of the given binary, the container manager agent, in response to a determination that the given binary is statically linked to, redirects the call for the given binary to the proxy launcher.

14. A computer-implemented method for injecting agents into process executing on a host computer, comprising:
   receiving, by an interceptor, a request to execute a given binary, where the interceptor is instrumented in a first process running under an operating system on the host computer;
   analyzing, by the interceptor, the given binary to determine linking status for the given binary;
   launching, by the interceptor, a proxy launcher in a proxy process of an execution environment managed by the operating system, where the proxy launcher is launched in response to a determination that the given binary is statically linked to;
   launching, by the proxy launcher, a child process for executing the given binary;
   copying, by the operating system, a memory image of the given binary into a memory assigned to the child process;
   copying, by the proxy launcher, a memory image of the given binary from the child process to a memory assigned to the proxy process;
   loading, by the proxy launcher, a monitoring agent into the proxy process, where the monitoring agent instruments the memory image of the given binary in the proxy process; and
   starting, by the proxy launcher, execution of the memory image of the given binary in the proxy process.

15. The method of claim 14 wherein parameters of a command to start the proxy launcher includes name of the given binary and path for the given binary.

16. The method of claim 14 further comprises monitoring, by the monitoring agent, execution of the given binary; and sending, by the monitoring agent, performance data describing execution of the given binary across a network to a monitor server.

17. The method of claim 14 further comprises receiving, by the proxy launcher, a notification regarding the loading of the memory image for the given binary launching and copying the memory image for the given binary into the memory assigned to the proxy process in response to receiving the notification and prior to execution of the given binary in the child process.

18. The method of claim 14 further comprises installing, by the monitoring agent, a second interceptor in the memory image of the given binary in the proxy process, where the second interceptor is configured to receive a request to execute another binary and analyzes the another binary to determine linking status.

19. The method of claim 14 further comprises determining, by the proxy launcher, whether functionality of the given binary conflicts with functionality of the monitoring agent prior to launching the child process.

20. The method of claim 19 further comprises copying the memory image of the given binary into a memory assigned to the proxy process, loading the monitoring agent into the proxy process and starting execution of the memory image of the given binary in the proxy process only in response to a determination that functionality of the given binary does not conflict with functionality of the monitoring agent.

21. The method of claim 20 further comprises launching a minimal proxy launcher in a minimal proxy process of an execution environment managed by the operating system in response to a determination that functionality of the given binary conflicts with functionality of the monitoring agent, wherein the minimal proxy launcher copies a memory image of the given binary into a memory assigned to the minimal proxy process and instruments a memory image of the given binary with a third interceptor, where the third interceptor is configured to receive a request to execute another binary and analyzes the another binary to determine linking status.

22. The method of claim 20 further comprises sending a notification that the proxy process is not instrumented with an agent to a monitor server in response to a determination that functionality of the given binary conflicts with functionality of the monitoring agent.

23. The method of claim 14 further comprises intercepting calls of a container manager process to execute the given binary in a given process running in a container and determining linking status of the given binary, and redirecting the call for the given binary to the proxy launcher in response to a determination that the given binary is statically linked to, where processes running in the container are isolated from processes running directly on the operating system using operating-system level virtualization.

24. The system of claim 8 wherein the proxy launcher determines whether a memory address conflict between the memory image of the given binary and a memory location of proxy launcher functionality exists; and in response of an identified memory address conflict, delegates to another variant of a proxy launcher having proxy launcher functionality located in memory location that causes no memory address conflicts with the memory image of the given binary.

* * * * *